US 9,269,063 B2

(12) United States Patent
Levien et al.

(10) Patent No.: US 9,269,063 B2
(45) Date of Patent: *Feb. 23, 2016

(54) ACQUIRING AND TRANSMITTING EVENT RELATED TASKS AND SUBTASKS TO INTERFACE DEVICES

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 525 days.

This patent is subject to a terminal disclaimer.

(21) Appl. No.: 13/436,464

(22) Filed: Mar. 30, 2012

(65) Prior Publication Data

US 2013/0081032 A1  Mar. 28, 2013

Related U.S. Application Data

(63) Continuation of application No. 13/436,463, filed on Mar. 30, 2012, and a continuation-in-part of application No. 13/200,553, filed on Sep. 23, 2011, and a continuation-in-part of application No. 13/200,797, filed on Sep. 30, 2011, now abandoned, and a continuation-in-part of application No. 13/317,591, filed on Oct. 21, 2011, and a continuation-in-part of application No. 13/317,833, (Continued)

(51) Int. Cl.
*G08B 21/00* (2006.01)
*G06Q 10/06* (2012.01)

(52) U.S. Cl.
CPC ................ *G06Q 10/06311* (2013.01)

(58) Field of Classification Search
CPC ........ G08B 21/12; G08B 25/14; H04L 67/12; H04L 67/25; G06Q 10/06311
USPC .............. 340/540, 568.1, 600, 601, 679, 652, 340/657, 539.13, 573.1, 573.4, 309.16, 340/870.09, 870.16; 718/100, 104; 719/318; 709/201, 217, 222, 226
See application file for complete search history.

(56) References Cited

U.S. PATENT DOCUMENTS

| | | | |
|---|---|---|---|
| 4,807,200 A * | 2/1989 | Montes et al. ................. 367/76 |
| 5,740,357 A | 4/1998 | Gardiner et al. | |
| 5,815,793 A | 9/1998 | Ferguson | |
| 6,112,225 A | 8/2000 | Kraft et al. | |
| 6,112,246 A * | 8/2000 | Horbal et al. ................ 709/230 |
| 6,173,279 B1 | 1/2001 | Levin et al. | |
| 6,212,554 B1 | 4/2001 | Roskowski | |
| 6,654,783 B1 | 11/2003 | Hubbard | |
| 6,714,967 B1 | 3/2004 | Horvitz | |
| 6,966,033 B1 | 11/2005 | Gasser et al. | |
| 6,978,422 B1 | 12/2005 | Bushe et al. | |
| 7,017,158 B2 | 3/2006 | Sasaki | |
| 7,069,560 B1 | 6/2006 | Cheyer et al. | |
| 7,162,414 B2 | 1/2007 | Stanford | |
| 7,194,409 B2 | 3/2007 | Balentine et al. | |
| 7,219,058 B1 | 5/2007 | Rose et al. | |

(Continued)

*Primary Examiner* — Thomas Mullen

(57) ABSTRACT

Computationally implemented methods and systems include detecting an occurrence of an event, acquiring one or more subtasks configured to be carried out by two or more discrete interface devices, the subtasks corresponding to portions of one or more tasks of acquiring information related to the event, facilitating transmission of the one or more subtasks to the two or more discrete interface devices, and receiving data corresponding to a result of the one or more subtasks executed by two or more of the two or more discrete interface devices. In addition to the foregoing, other aspects are described in the claims, drawings, and text.

30 Claims, 28 Drawing Sheets

Related U.S. Application Data filed on Oct. 28, 2011, and a continuation-in-part of application No. 13/373,795, filed on Nov. 29, 2011, and a continuation-in-part of application No. 13/373,794, filed on Nov. 29, 2011, and a continuation-in-part of application No. 13/373,826, filed on Nov. 30, 2011, and a continuation-in-part of application No. 13/373,829, filed on Nov. 30, 2011, now abandoned, and a continuation-in-part of application No. 13/374,512, filed on Dec. 30, 2011, now abandoned, and a continuation-in-part of application No. 13/374,514, filed on Dec. 30, 2011, and a continuation-in-part of application No. 13/374,529, filed on Dec. 30, 2011, and a continuation-in-part of application No. 13/374,527, filed on Dec. 30, 2011, and a continuation-in-part of application No. 13/374,511, filed on Dec. 30, 2011, now abandoned, and a continuation-in-part of application No. 13/374,518, filed on Dec. 30, 2011, now abandoned, and a continuation-in-part of application No. 13/374,522, filed on Dec. 30, 2011, now abandoned, and a continuation-in-part of application No. 13/341,901, filed on Dec. 30, 2011.

(56) References Cited

U.S. PATENT DOCUMENTS

| | | |
|---|---|---|
| 7,251,221 B2 | 7/2007 | Wall et al. |
| 7,271,720 B2 * | 9/2007 | Tabe ............................ 340/540 |
| 7,366,742 B1 | 4/2008 | Umbehocker et al. |
| 7,535,350 B2 * | 5/2009 | Shin ............................. 340/540 |
| 7,609,159 B2 * | 10/2009 | Benson et al. ................ 340/540 |
| 7,810,099 B2 | 10/2010 | Dettinger et al. |
| 7,840,969 B2 | 11/2010 | Comer |
| 7,945,469 B2 | 5/2011 | Cohen et al. |
| 8,321,870 B2 | 11/2012 | Messier et al. |
| 8,350,758 B1 | 1/2013 | Parvizi et al. |
| 8,484,279 B1 | 7/2013 | Cole |
| 8,522,341 B2 | 8/2013 | Nochta et al. |
| 8,843,614 B2 | 9/2014 | Yoon et al. |
| 2001/0056482 A1 | 12/2001 | Lewis et al. |
| 2002/0091752 A1 | 7/2002 | Firlie |
| 2002/0147579 A1 | 10/2002 | Kushner et al. |
| 2002/0188446 A1 | 12/2002 | Gao et al. |
| 2003/0069901 A1 | 4/2003 | Schein |
| 2003/0088421 A1 | 5/2003 | Maes et al. |
| 2003/0105849 A1 | 6/2003 | Iwamoto et al. |
| 2003/0131285 A1 | 7/2003 | Beardsley et al. |
| 2004/0130572 A1 | 7/2004 | Bala |
| 2004/0199388 A1 | 10/2004 | Armbruster et al. |
| 2005/0057778 A1 | 3/2005 | Morikawa et al. |
| 2005/0125578 A1 | 6/2005 | Liao et al. |
| 2005/0138618 A1 | 6/2005 | Gebhart |
| 2006/0048157 A1 | 3/2006 | Dawson et al. |
| 2006/0059565 A1 | 3/2006 | Green et al. |
| 2006/0068812 A1 | 3/2006 | Carro et al. |
| 2006/0184940 A1 | 8/2006 | Urhan |
| 2006/0236323 A1 | 10/2006 | Neill et al. |
| 2007/0168861 A1 | 7/2007 | Bell et al. |
| 2007/0236345 A1 * | 10/2007 | Yu et al. .................... 340/539.22 |
| 2007/0287482 A1 | 12/2007 | Landsman et al. |
| 2008/0008127 A1 | 1/2008 | Choi et al. |
| 2008/0120619 A1 | 5/2008 | Podila |
| 2008/0201381 A1 | 8/2008 | Desai et al. |
| 2008/0219589 A1 | 9/2008 | Jung et al. |
| 2008/0250413 A1 | 10/2008 | Shi |
| 2008/0263208 A1 | 10/2008 | White |
| 2008/0313312 A1 | 12/2008 | Flynn et al. |
| 2009/0063144 A1 | 3/2009 | Rose et al. |
| 2009/0070412 A1 | 3/2009 | D'Angelo et al. |
| 2009/0125370 A1 | 5/2009 | Blondeau et al. |
| 2009/0177775 A1 | 7/2009 | Radia et al. |
| 2009/0182554 A1 | 7/2009 | Abraham et al. |
| 2009/0254774 A1 | 10/2009 | Chamdani et al. |
| 2009/0254916 A1 | 10/2009 | Bose et al. |
| 2009/0265217 A1 | 10/2009 | Aurenz |
| 2009/0290689 A1 | 11/2009 | Watanabe et al. |
| 2010/0050180 A1 | 2/2010 | Amsterdam et al. |
| 2010/0115478 A1 | 5/2010 | Pedenon et al. |
| 2010/0223216 A1 | 9/2010 | Eggert et al. |
| 2011/0010581 A1 | 1/2011 | Tanttu et al. |
| 2011/0029307 A1 | 2/2011 | Parthasarathy et al. |
| 2011/0035757 A1 | 2/2011 | Comer |
| 2011/0041136 A1 | 2/2011 | Messier et al. |
| 2011/0105097 A1 | 5/2011 | Tadayon et al. |
| 2011/0126209 A1 | 5/2011 | Housty |
| 2011/0138394 A1 | 6/2011 | Ravishankar et al. |
| 2011/0161391 A1 | 6/2011 | Araujo et al. |
| 2011/0167425 A1 | 7/2011 | Lurie et al. |
| 2011/0191775 A1 | 8/2011 | Omara et al. |
| 2011/0225276 A1 | 9/2011 | Hamilton, II et al. |
| 2011/0307957 A1 | 12/2011 | Barcelo et al. |
| 2012/0042003 A1 | 2/2012 | Goetz et al. |
| 2012/0042320 A1 | 2/2012 | Jamjoom et al. |
| 2012/0060163 A1 | 3/2012 | Khan et al. |
| 2012/0060212 A1 | 3/2012 | Inoue |
| 2012/0277914 A1 | 11/2012 | Crow et al. |
| 2013/0275983 A1 | 10/2013 | Horvitz et al. |

* cited by examiner

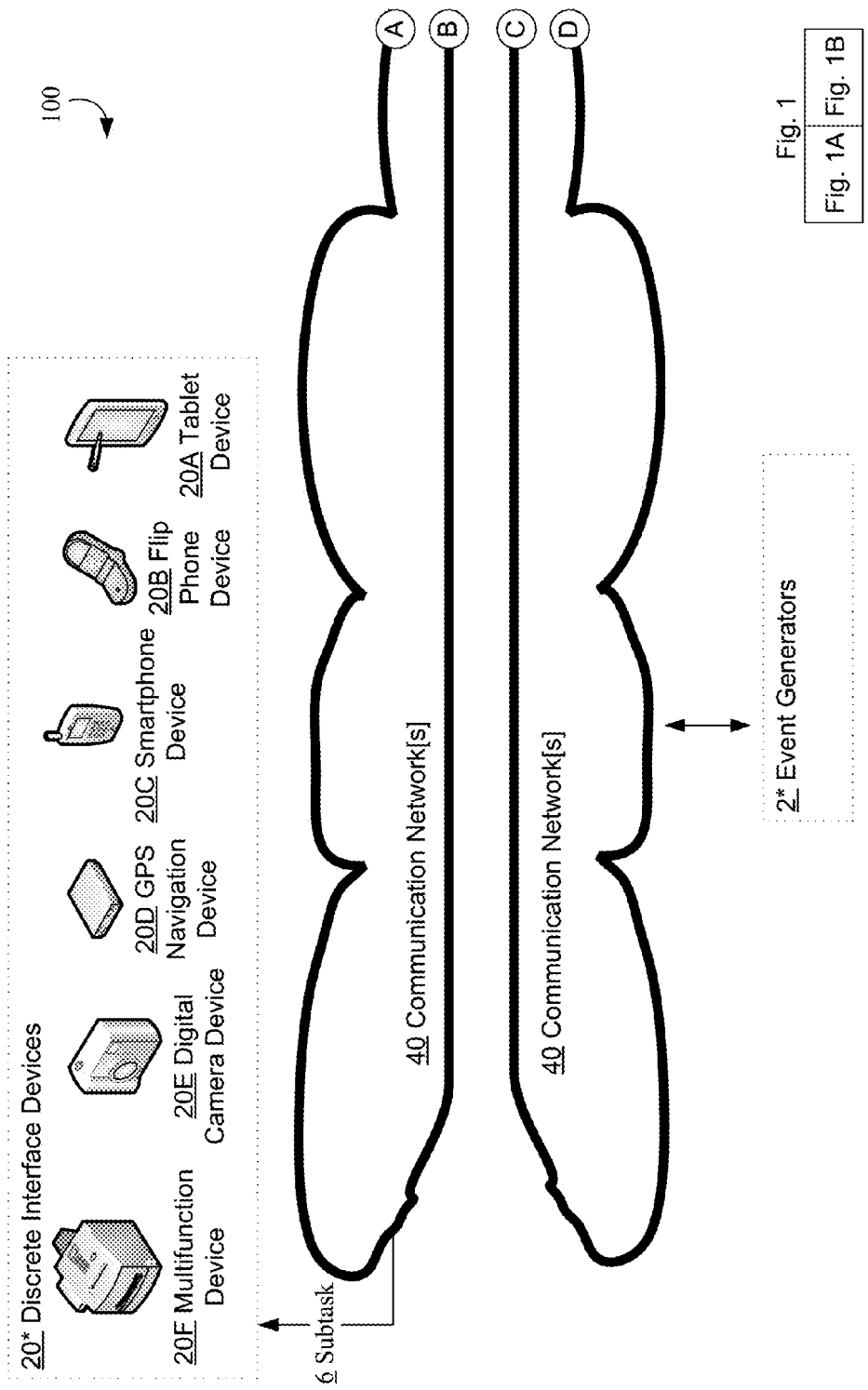

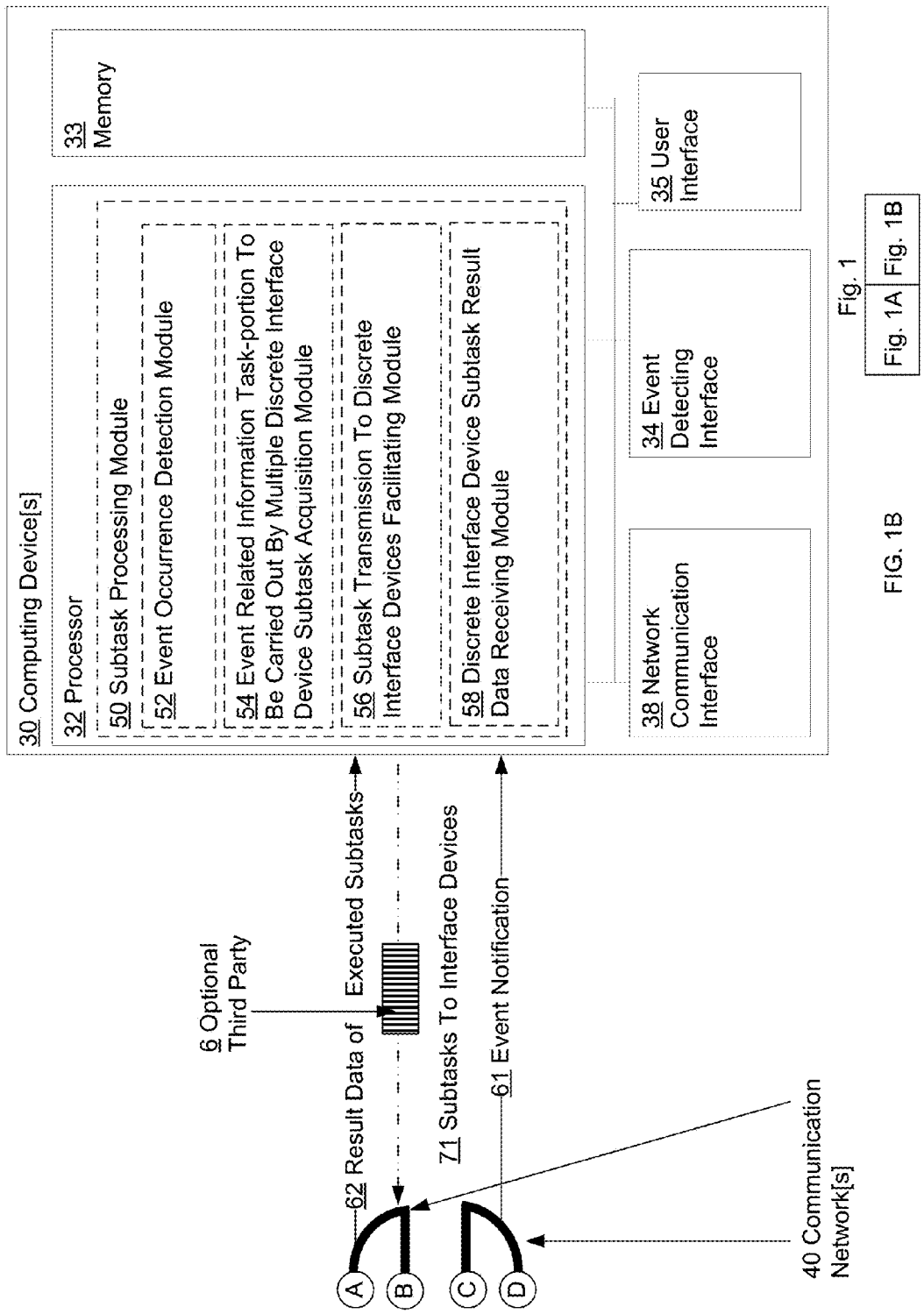

52 Event Occurrence Detection Module

238 Event Occurrence Detection At Particular Location Module

240 Event Having Particular Property Occurrence Detection Module

- 242 Event Affecting Particular Number Of People Occurrence Detection Module
- 244 Event Visible To Particular Number Of People Occurrence Detection Module
- 246 Natural Disaster Event Occurrence Detection Module
  - 248 Earthquake Event Occurrence Detection Module
- 250 Man-made Structure Failure Event Occurrence Detection Module
  - 252 Power Grid Portion Failure Event Occurrence Detection Module
  - 254 Cellular Radio Tower Outage Event Occurrence Detection Module
  - 256 Wireless Radio Structure Outage Event Occurrence Detection Module

| Fig. 2A | Fig. 2B | Fig. 2C | Fig. 2D |

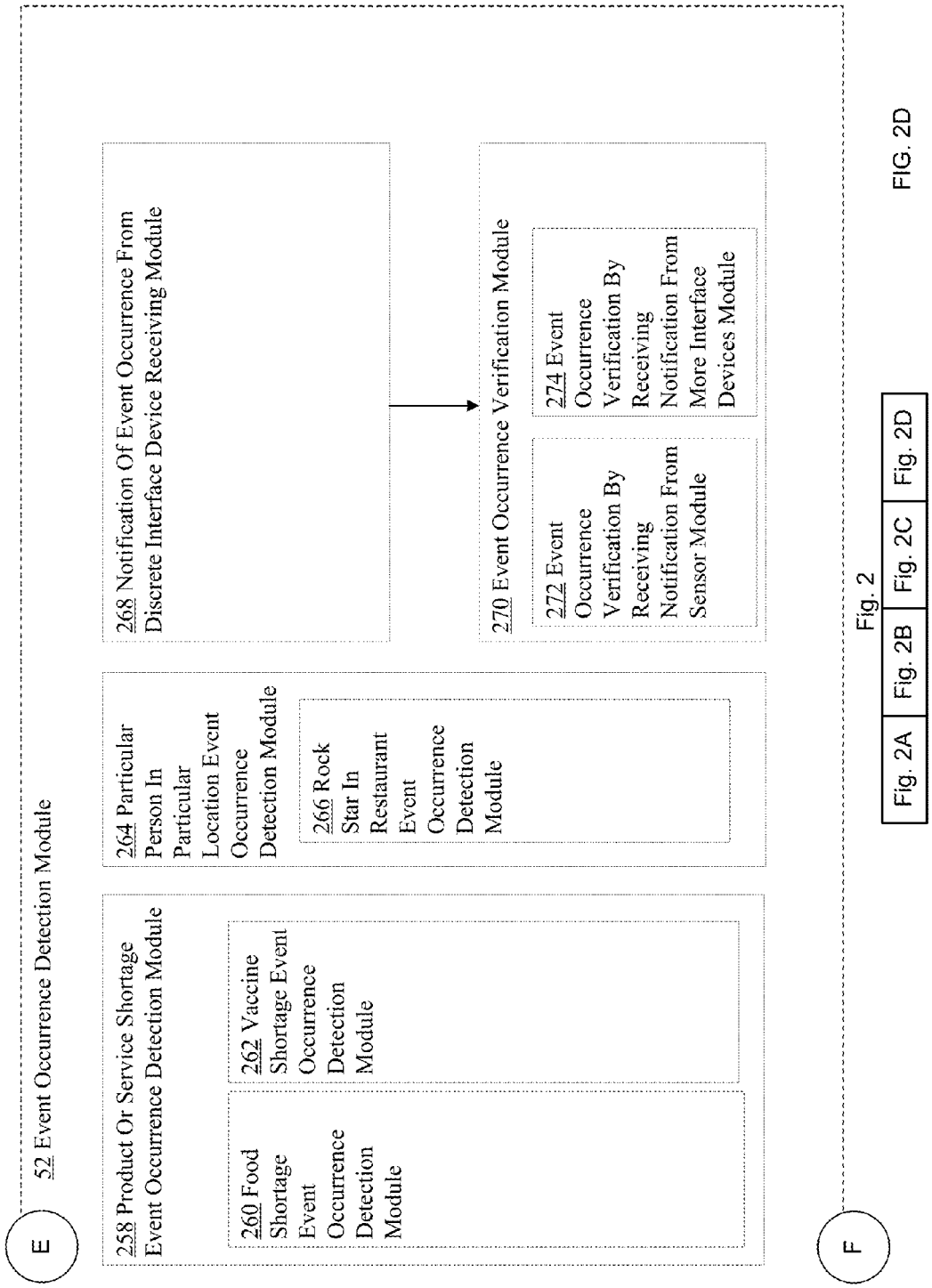

FIG. 3A1

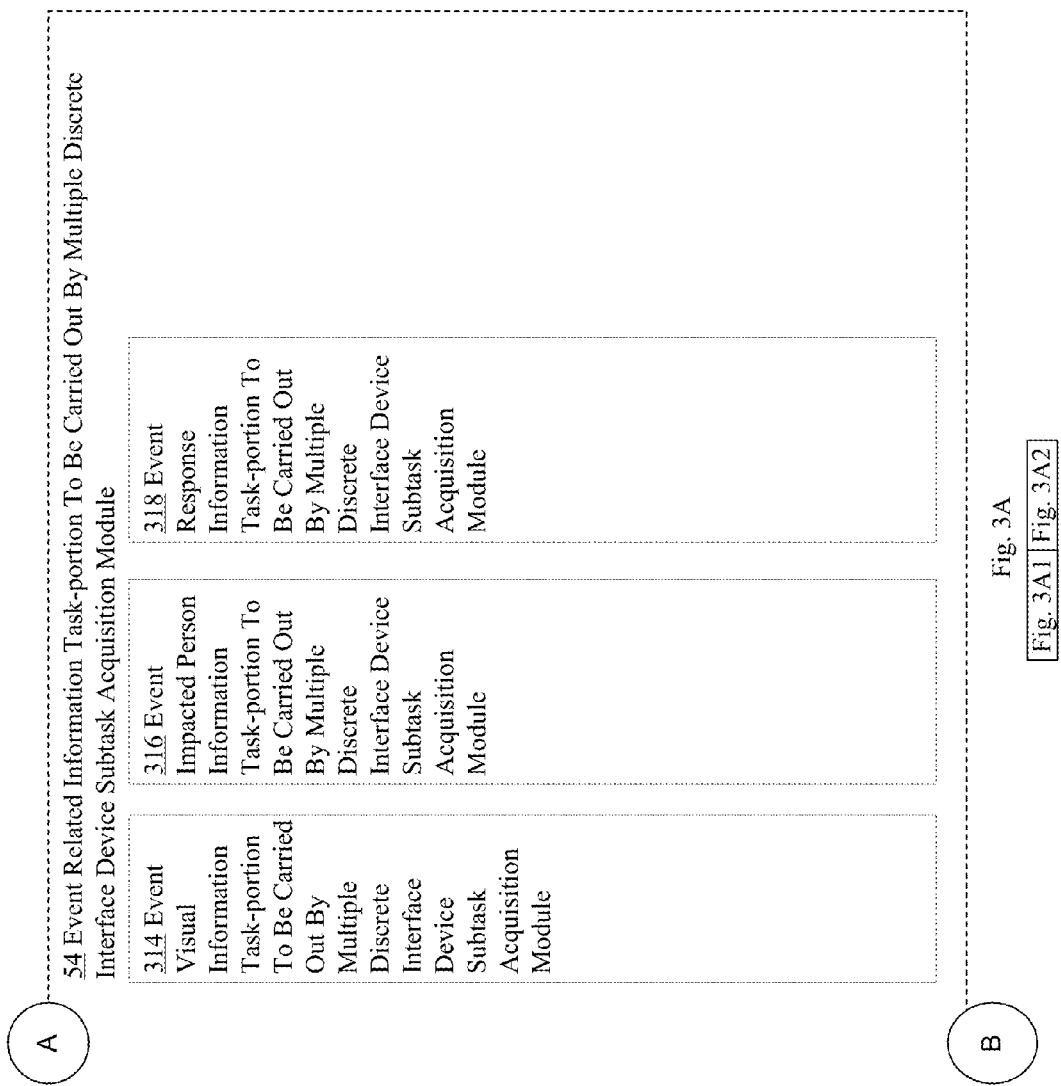

56 Subtask Transmission To Discrete Interface Devices Facilitating Module

| 322 Subtask To Discrete Interface Devices Transmitting Module | 324 Subtask To Discrete Interface Device-Transmitting-configured Location Transmitting Module | 326 Subtask To Received Set Of Discrete Interface Devices Transmitting Module | 328 Subtask To Location Configured To Distribute Subtasks To Discrete Interface Devices Transmitting Module | 330 Subtask To Location Where Discrete Interface Devices Are Configured To Receive Subtasks Transmitting Module | 332 Subtask Transmitting To Location That Visibly Displays Subtasks To Two Or More Discrete Interface Devices Module |

| Fig. 3B1 | Fig. 3B2 | Fig. 3B3 | Fig. 3B4 |

FIG. 3B1

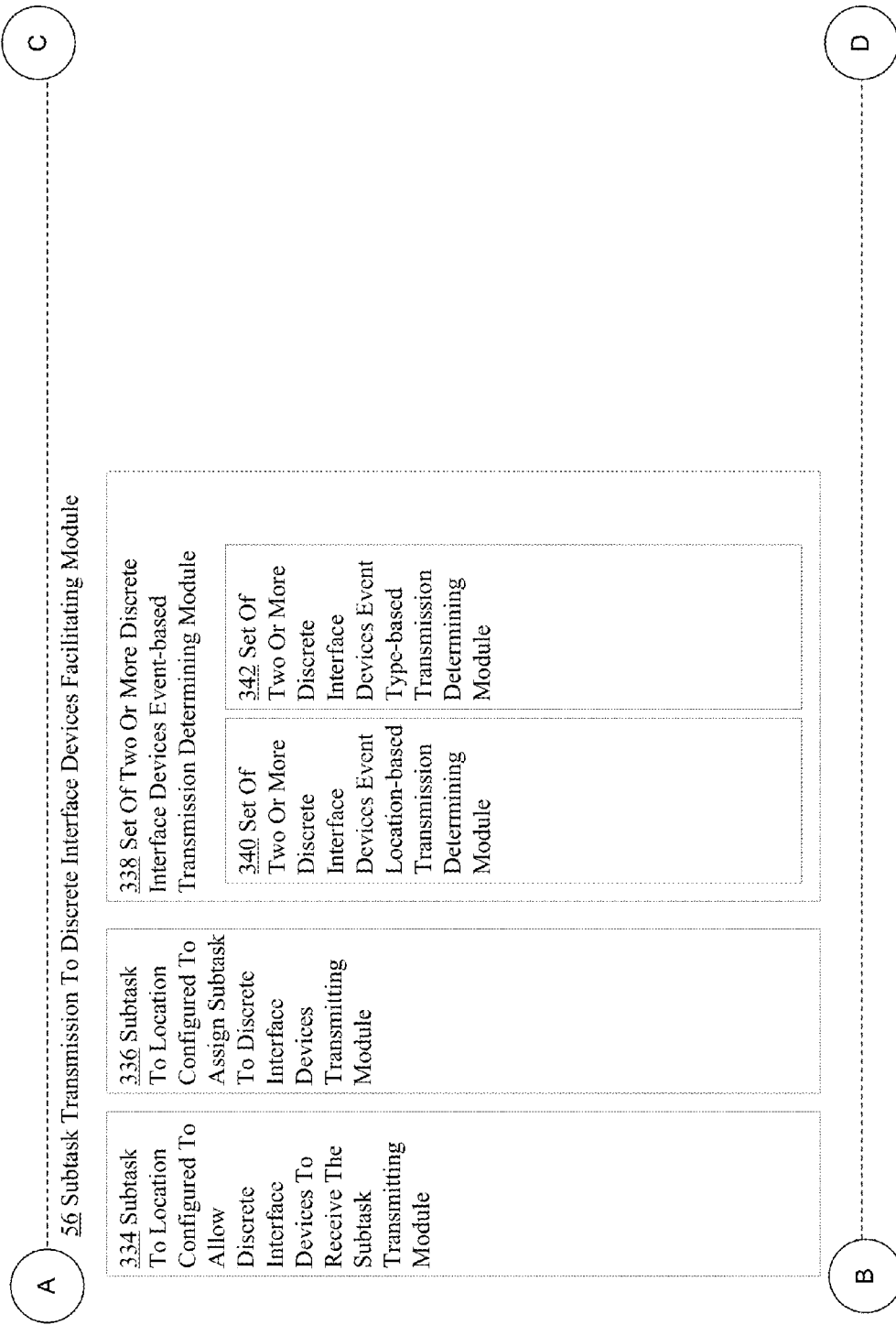
FIG. 3B2

FIG. 3B3

56 Subtask Transmission To Discrete Interface Devices Facilitating Module

366 Signal Including Subtask Receiving Instructions Transmitting To Discrete Interface Devices Module

368 Signal Including Instructions To Prepare For Subtask Receipt Transmitting To Discrete Interface Devices Module

370 Signal Requesting Information Regarding Whether Discrete Interface Devices Were Affected By The Event Transmitting Module

Fig. 3B

| Fig. 3B1 | Fig. 3B2 | Fig. 3B3 | Fig. 3B4 |

58 Discrete Interface Device Subtask Result Data Receiving Module

402 Discrete Interface Device Executing Subtask In Absence Of Information Regarding Task Requestor And/or Event Result Data Receiving Module

404 Discrete Interface Device Executing Subtask With Incomplete Information Regarding Task Requestor And/or Event Result Data Receiving Module

406 Discrete Interface Device Executing Subtask With Insufficient Information Regarding Task Requestor And/or Event Result Data Receiving Module

408 Discrete Interface Device Executing Subtask With Less Information Regarding Task Requestor And/or Event Result Data Receiving Module

410 Each Of Two Or More Discrete Interface Devices Subtask Result Data Receiving Module

412 Each Of Two Or More Discrete Interface Devices Subtask Result Data Receiving Directly From Two Or More Discrete Interface Devices Module

414 Each Of Two Or More Discrete Interface Devices Subtask Result Data Receiving From Third Party Module

504 acquiring one or more subtasks configured to be carried out by two or more discrete interface devices, the subtasks corresponding to portions of one or more tasks of acquiring information related to the event

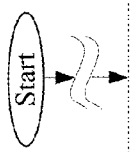

702 acquiring one or more subtasks configured to be carried out by two or more discrete interface devices, the subtasks corresponding to portions of a task of acquiring information about the event

704 generating one or more subtasks configured to be carried out by two or more discrete interface devices, the one or more subtasks corresponding to portions of one or more tasks of acquiring information related to the event

706 generating, in response to the event, one or more subtasks configured to be carried out by two or more discrete interface devices, the one or more subtasks corresponding to portions of one or more tasks of acquiring information related to the event

708 acquiring one or more subtasks configured to be carried out by two or more discrete interface devices, the subtasks corresponding to portions of one or more tasks of acquiring information regarding the exact location of the event

710 acquiring one or more subtasks configured to be carried out by two or more discrete interface devices, the subtasks corresponding to portions of one or more tasks of acquiring information regarding a duration of the event

712 acquiring one or more subtasks configured to be carried out by two or more discrete interface devices, the subtasks corresponding to portions of one or more tasks of acquiring information regarding an area affected by the event

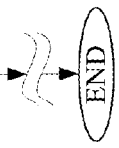

FIG. 7A 506 facilitating transmission of the one or more subtasks to the two or more discrete interface devices 824 determining a set of two or more discrete interface devices configured to carry out the one or more subtasks based on at least one property of the two or more discrete interface devices 826 determining a set of two or more discrete interface devices configured to carry out the one or more subtasks based on at least one status of the two or more discrete interface devices 828 determining a set of two or more discrete interface devices configured to carry out the one or more subtasks based on at least one environment-dependent property of the two or more discrete interface devices 830 determining a set of two or more discrete interface devices configured to carry out the one or more subtasks based on at least one of a particular position, proximity to the interface device, event, acceleration, velocity, and an ambient condition surrounding the interface device, of the at least two interface devices 832 determining a set of two or more discrete interface devices configured to carry out the one or more subtasks based on at least one characteristic of the two or more discrete interface devices 834 determining a set of two or more discrete interface devices configured to carry out the one or more subtasks based on at least one environment-independent property of the two or more discrete interface devices 836 determining a set of two or more discrete interface devices configured to carry out the one or more subtasks based on a presence of one or more of a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor of the two or more discrete interface devices

FIG. 8C 506 facilitating transmission of the one or more subtasks to the two or more discrete interface devices 824 determining a set of two or more discrete interface devices configured to carry out the one or more subtasks based on at least one property of the two or more discrete interface devices 838 determining a set of two or more discrete interface devices configured to carry out the one or more subtasks based on at least one property of the two or more discrete interface devices used to collect information regarding the event 840 determining a set of two or more discrete interface devices configured to carry out the one or more subtasks based on a presence of a barometer within the two or more discrete interface devices, used to collect information regarding the hurricane event 842 transmitting a signal to the two or more discrete interface devices to activate execution of the one or more subtasks which were previously transmitted to the two or more discrete interface devices 844 transmitting a signal to the two or more discrete interface devices to activate execution of the one or more subtasks which were previously transmitted to the two or more discrete interface devices prior to the occurrence of the event

FIG. 8D

ACQUIRING AND TRANSMITTING EVENT RELATED TASKS AND SUBTASKS TO INTERFACE DEVICES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

For purposes of the USPTO extra-statutory requirements, the present application constitutes a continuation of U.S. patent application Ser. No. 13/436,463, entitled ACQUIRING AND TRANSMITTING EVENT RELATED TASKS AND SUBTASKS TO INTERFACE DEVICES, naming Royce A. Levien, Richard T. Lord, Robert W. Lord, Mark A. Malamud, and John D. Rinaldo, Jr. as inventors, filed Mar. 30, 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/200,553, entitled ACQUIRING AND TRANSMITTING TASKS AND SUBTASKS TO INTERFACE DEVICES, naming Royce A. Levien; Richard T. Lord; Robert W. Lord; Mark A. Malamud; and John D. Rinaldo, Jr., as inventors, filed Sep. 23, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,797, entitled ACQUIRING AND TRANSMITTING TASKS AND SUBTASKS TO INTERFACE DEVICES, naming Royce A. Levien; Richard T. Lord; Robert W. Lord; Mark A. Malamud; and John D. Rinaldo, Jr., as inventors, filed Sep. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/317,591, entitled ACQUIRING, PRESENTING AND TRANSMITTING TASKS AND SUBTASKS TO INTERFACE DEVICES, naming Royce A. Levien; Richard T. Lord; Robert W. Lord; Mark A. Malamud; and John D. Rinaldo, Jr., as inventors, filed Oct. 21, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/317,833, entitled ACQUIRING, PRESENTING AND TRANSMITTING TASKS AND SUBTASKS TO INTERFACE DEVICES, naming Royce A. Levien; Richard T. Lord; Robert W. Lord; Mark A. Malamud; and John D. Rinaldo, Jr., as inventors, filed Oct. 28, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,795, entitled METHODS AND DEVICES FOR RECEIVING AND EXECUTING SUBTASKS, naming Royce A. Levien; Richard T. Lord; Robert W. Lord; Mark A. Malamud; and John D. Rinaldo, Jr., as inventors, filed Nov. 29, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,794, entitled METHODS AND DEVICES FOR RECEIVING AND EXECUTING SUBTASKS, naming Royce A. Levien; Richard T. Lord; Robert W. Lord; Mark A. Malamud; and John D. Rinaldo, Jr., as inventors, filed Nov. 29, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,826, entitled ACQUIRING TASKS AND SUBTASKS TO BE CARRIED OUT BY INTERFACE DEVICES, naming Royce A. Levien; Richard T. Lord; Robert W. Lord; Mark A. Malamud; and John D. Rinaldo, Jr., as inventors, filed Nov. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,829, entitled ACQUIRING TASKS AND SUBTASKS TO BE CARRIED OUT BY INTERFACE DEVICES, naming Royce A. Levien; Richard T. Lord; Robert W. Lord; Mark A. Malamud; and John D. Rinaldo, Jr., as inventors, filed Nov. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,512, entitled ACQUIRING TASKS AND SUBTASKS TO BE CARRIED OUT BY INTERFACE DEVICES, naming Royce A. Levien; Richard T. Lord; Robert W. Lord; Mark A. Malamud; and John D. Rinaldo, Jr., as inventors, filed Dec. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,514, entitled ACQUIRING TASKS AND SUBTASKS TO BE CARRIED OUT BY INTERFACE DEVICES, naming Royce A. Levien; Richard T. Lord; Robert W. Lord; Mark A. Malamud; and John D. Rinaldo, Jr., as inventors, filed Dec. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,529, entitled ACQUIRING AND TRANSMITTING TASKS AND SUBTASKS TO INTERFACE DEVICES, AND OBTAINING RESULTS OF EXECUTED SUBTASKS, naming Royce A. Levien; Richard T. Lord; Robert W. Lord; Mark A. Malamud;

and John D. Rinaldo, Jr., as inventors, filed Dec. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,527, entitled ACQUIRING AND TRANSMITTING TASKS AND SUBTASKS TO INTERFACE DEVICES, AND OBTAINING RESULTS OF EXECUTED SUBTASKS, naming Royce A. Levien; Richard T. Lord; Robert W. Lord; Mark A. Malamud; and John D. Rinaldo, Jr., as inventors, filed Dec. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,511, entitled RECEIVING SUBTASK REPRESENTATIONS, AND OBTAINING AND COMMUNICATING SUBTASK RESULT DATA, naming Royce A. Levien; Richard T. Lord; Robert W. Lord; Mark A. Malamud; and John D. Rinaldo, Jr., as inventors, filed Dec. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,518, entitled RECEIVING SUBTASK REPRESENTATIONS, AND OBTAINING AND COMMUNICATING SUBTASK RESULT DATA, naming Royce A. Levien; Richard T. Lord; Robert W. Lord; Mark A. Malamud; and John D. Rinaldo, Jr., as inventors, filed Dec. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,522, entitled RECEIVING SUBTASK REPRESENTATIONS, AND OBTAINING AND COMMUNICATING SUBTASK RESULT DATA, naming Royce A. Levien; Richard T. Lord; Robert W. Lord; Mark A. Malamud; and John D. Rinaldo, Jr., as inventors, filed Dec. 30, 2011, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/341,901, entitled RECEIVING SUBTASK REPRESENTATIONS, AND OBTAINING AND COMMUNICATING SUBTASK RESULT DATA, naming Royce A. Levien; Richard T. Lord; Robert W. Lord; Mark A. Malamud; and John D. Rinaldo, Jr., as inventors, filed Dec. 30, 2011, which is currently co-pending, or is an application of which a currently co-pending application is entitled to the benefit of the filing date.

BACKGROUND

This application is related to using interface devices to collect data.

SUMMARY

A computationally implemented method includes, but is not limited to, detecting an occurrence of an event, acquiring one or more subtasks configured to be carried out by two or more discrete interface devices, the subtasks corresponding to portions of one or more tasks of acquiring information related to the event, facilitating transmission of the one or more subtasks to the two or more discrete interface devices, and receiving data corresponding to a result of the one or more subtasks executed by two or more of the two or more discrete interface devices. In addition to the foregoing, other method aspects are described in the claims, drawings, and text forming a part of the present disclosure.

In one or more various aspects, related systems include but are not limited to circuitry and/or programming for effecting the herein referenced method aspects; the circuitry and/or programming can be virtually any combination of hardware, software, and/or firmware in one or more machines or article of manufacture configured to effect the herein-referenced method aspects depending upon the design choices of the system designer.

A computationally-implemented system includes, but is not limited to, means for detecting an occurrence of an event, means for acquiring one or more subtasks configured to be carried out by two or more discrete interface devices, the subtasks corresponding to portions of one or more tasks of acquiring information related to the event, means for facilitating transmission of the one or more subtasks to the two or more discrete interface devices, and means for receiving data corresponding to a result of the one or more subtasks executed by two or more of the two or more discrete interface devices. In addition to the foregoing, other system aspects are described in the claims, drawings, and text forming a part of the present disclosure.

A computationally-implemented system includes, but is not limited to, circuitry for detecting an occurrence of an event, circuitry for acquiring one or more subtasks configured to be carried out by two or more discrete interface devices, the subtasks corresponding to portions of one or more tasks of acquiring information related to the event, circuitry for facilitating transmission of the one or more subtasks to the two or more discrete interface devices, and circuitry for receiving data corresponding to a result of the one or more subtasks executed by two or more of the two or more discrete interface devices.

A computer program product comprising an article of manufacture bears instructions including, but not limited to, one or more instructions for detecting an occurrence of an event, one or more instructions for acquiring one or more subtasks configured to be carried out by two or more discrete interface devices, the subtasks corresponding to portions of one or more tasks of acquiring information related to the event, one or more instructions for facilitating transmission of the one or more subtasks to the two or more discrete interface devices, and one or more instructions for receiving data corresponding to a result of the one or more subtasks executed by two or more of the two or more discrete interface devices.

A computationally-implemented method that specifies that a plurality of transistors and/or switches reconfigure themselves into a machine that carries out the following including, but not limited to, detecting an occurrence of an event, acquiring one or more subtasks configured to be carried out by two or more discrete interface devices, the subtasks corresponding to portions of one or more tasks of acquiring information related to the event, facilitating transmission of the one or more subtasks to the two or more discrete interface devices, and receiving data corresponding to a result of the one or more subtasks executed by two or more of the two or more discrete interface devices.

A computer architecture comprising at least one level, comprising architecture configured to detect an occurrence of an event, architecture configured to acquire one or more subtasks configured to be carried out by two or more discrete interface devices, the subtasks corresponding to portions of one or more tasks of acquiring information related to the event, architecture configured to facilitate transmission of the one or more subtasks to the two or more discrete interface devices, and architecture configured to receive data corresponding to a result of the one or more subtasks executed by two or more of the two or more discrete interface devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1, including FIGS. 1A and 1B, shows a high-level block diagram of an interface device operating in an exemplary environment 100, according to an embodiment.

FIG. 2, including FIGS. 2A-2D, shows a particular perspective of the event occurrence detection module 52 of the computing device 30 of environment 100 of FIG. 1.

FIGS. 3A1-3A2, shows a particular perspective of the subtask acquisition module 54 of the computing device 30 of environment 100 of FIG. 1.

FIGS. 3B1-3B4, shows a particular perspective of the subtask transmission to discrete interface devices facilitating module 56 of the computing device 30 of environment 100 of FIG. 1.

FIG. 4 shows a particular perspective of the discrete interface device subtask result data receiving module 58 of the computing device 30 of environment 100 of FIG. 1.

FIG. 7A is a high-level logic flowchart of a process depicting alternate implementations of a subtask acquiring operation 504 of FIG. 5.

FIG. 8C is a high-level logic flowchart of a process depicting alternate implementations of a transmission facilitating operation 506 of FIG. 5.

FIG. 8D is a high-level logic flowchart of a process depicting alternate implementations of a transmission facilitating operation 506 of FIG. 5.

DETAILED DESCRIPTION

Figure 2A:
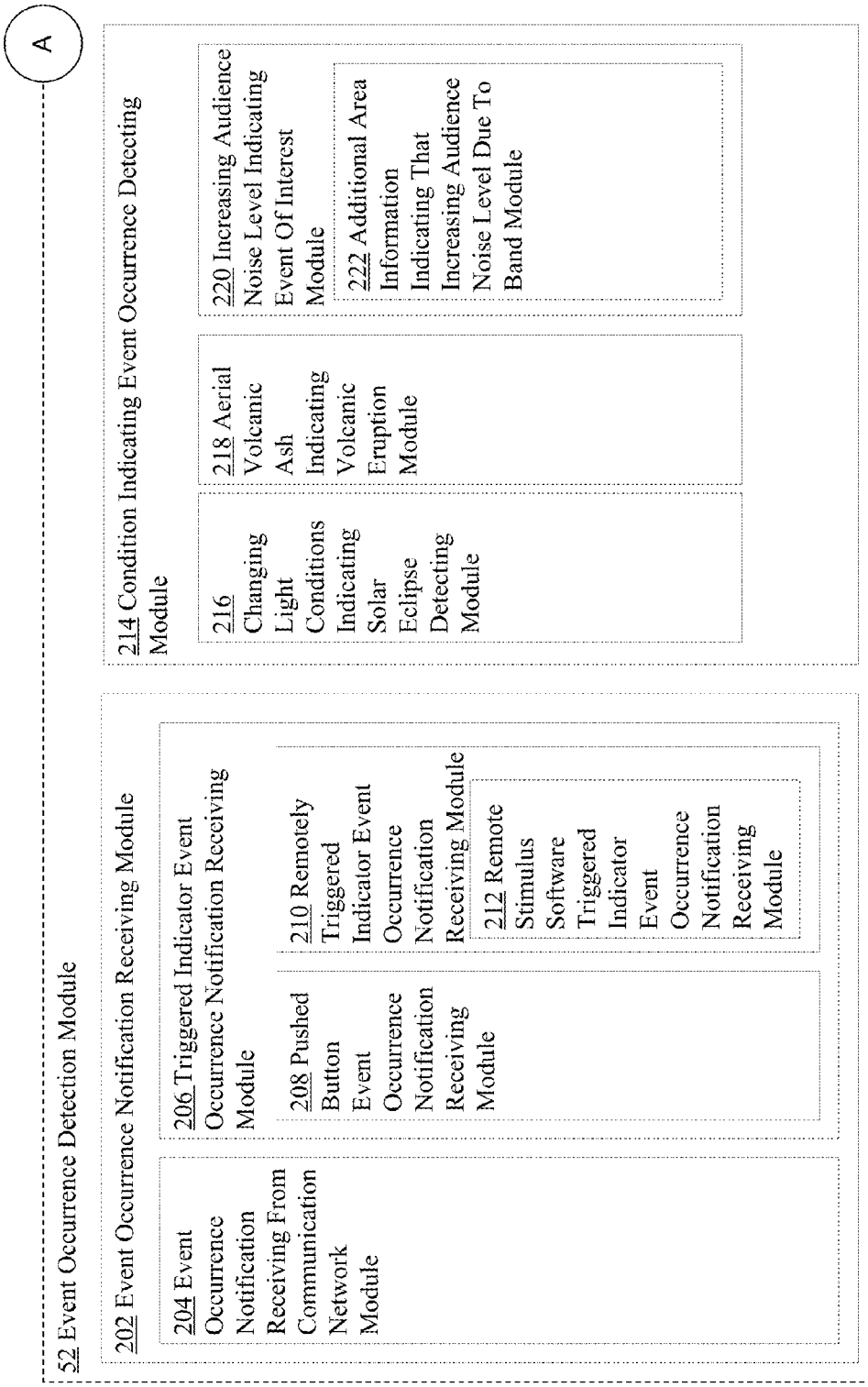

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

The emergence of portable computing devices (e.g., laptop computers, computer tablets, digital music players, personal navigation systems, net books, smart phones, personal digital assistants ("PDAs"), digital still cameras, digital video cameras, and handheld game devices, e.g., PlayStation Portable and Nintendo 3DS) into all segments of society over the last two decades has resulted in vast socioeconomic benefits generally enriching the lives of those who choose to take advantage of the benefits that such devices provide. The rise in the portability of such devices has provided a wealth of information available to a user.

In addition, the promulgation of portable electronic devices, each having their own set of unique sensors and detectors, has been widespread. Currently, there are very few populated areas of developed countries which do not contain a large number of portable computing devices at any given time. These portable computing devices are constantly collecting data, and capable of collecting data, which is not stored in any repository or transmitted to any device which may use such data. Thus, such data, and opportunity to collect data, may be lost.

Moreover, many different types of events take place in today's world. Events may be more mundane, like a home run at a baseball game, or a sighting of a celebrity at a restaurant, or may be more extreme, like an earthquake, or a nuclear power plant meltdown. Regardless of the magnitude of the event, there are often people, and thus portable electronic devices, in positions to collect data about the event, the effect, and the aftermath. In many instances, these portable electronic devices are situated well to deliver data which can be compiled and used to create answer to questions regarding the events. Thus, these devices may be used to collect data related to or regarding an event, whether small, large, man-made, natural, or otherwise, as will be described in more detail herein.

In accordance with various embodiments, computationally implemented methods, systems, circuitry, articles of manufacture, and computer program products are designed to, among other things, provide an interface for detecting an occurrence of an event, acquiring one or more subtasks configured to be carried out by two or more discrete interface devices, the subtasks corresponding to portions of one or more tasks of acquiring information related to the event, facilitating transmission of the one or more subtasks to the two or more discrete interface devices, and receiving data corresponding to a result of the one or more subtasks executed by two or more of the two or more discrete interface devices.

The foregoing summary is illustrative only and is not intended to be in any way limiting. In addition to the illustrative aspects, embodiments, and features described above, further aspects, embodiments, and features will become apparent by reference to the drawings and the following detailed description.

Referring now to FIG. 1, FIG. 1 illustrates an example environment 100 in which the methods, systems, circuitry, articles of manufacture, and computer program products and architecture, in accordance with various embodiments, may be implemented by computing device 30. It is noted that, in the context of this application, "computing device 30" means "computing device 30." The computing device 30, in various embodiments, may be endowed with logic that is designed for detecting an occurrence of an event, acquiring one or more subtasks configured to be carried out by two or more discrete interface devices, the subtasks corresponding to portions of one or more tasks of acquiring information related to the event, facilitating transmission of the one or more subtasks to the two or more discrete interface devices, and receiving data corresponding to a result of the one or more subtasks executed by two or more of the two or more discrete interface devices. Specifically, FIG. 1 illustrates an operational flow 100 representing example operations for, among other things, interfacing with a system of interface devices to detect an event, acquire subtasks, facilitate transmission of the subtasks to the discrete interface devices, and receiving result data.

Note that in the following description, the character "*" represents a wildcard. Thus, references to interface devices 20* of FIG. 1 may be in reference to tablet device 20A, flip phone device 20B, smartphone device 20C, GPS navigation device 20D, digital camera device 20E, multifunction device 20F, and weather station device 20G. These drawings are meant to be illustrative only, and should not be construed as limiting the definition of interface devices 20*, which can be any device with computing functionality.

Within the context of this application, "discrete interface device" is defined as an "interface device capable of operating or being operated independently of other discrete interface devices." The discrete interface devices may be completely unaware of each other, and are not necessarily the same type. For example, discrete interface devices 20*, which will be described in more detail herein, include but are not limited to laptop computers, computer tablets, digital music players, personal navigation systems, net books, smart phones, PDAs, digital still cameras, digital video cameras, vehicle assistance systems, and handheld game devices. For the purposes of this application, the type of interface device is not important, except that it can communicate with a communications network, and that it has device characteristics and status, as will be described in more detail herein.

Referring again to the exemplary environment 100 of FIG. 1, in various embodiments, event generators 2* may generate an event. Event generators 2* may be natural, artificial, computers, human, or any entity capable of generating an event. In addition, in some embodiments, event generators 2* may generate events which are detected by event detecting interface 34. Event generators 2* are shown as interacting with communication network 40, but for ease of illustration, intermediary steps are omitted here. For example, an earthquake may be an event generator, which may trigger a seismograph (not pictured), which may detect the earthquake, and send a signal via communication network 40. Such intermediate steps are not critical to the understanding of the invention, and are omitted for clarity and ease of understanding.

The computing device 30 may communicate via a communications network 40. In various embodiments, the communication network 40 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 40 may be wired, wireless, or a combination of wired and wireless networks. It is noted that "communication network" here refers to communication networks, which may or may not interact with each other.

Computing device 30 may include a network interface module 38 to facilitate communications with communications network 40. Network interface module 38, which may be implemented as hardware or software, or both, used to interface the computing device 30 with the one or more communication networks 40. In some embodiments, the network interface module 38 may be a Network Interface Card, e.g., a NIC, or an antenna. The specific structure of network interface module 38 depends on the type or types of one or more communication networks 40 that are used. Particular details of this transmission will be discussed in more detail herein.

Computing device 30 may further include an event detecting interface 34. This interface may include a variety of sensors, monitors, and inputs. For example, event detecting interface 34 may be implemented as a button or series of buttons that are pushed when certain events happen. In other embodiments, event detecting interface 34 may be one or more sensors configured to detect various things. In still other embodiments, event detecting interface 34 may be a combination of these things.

As shown in FIG. 1, computing device 30 may receive an event notification 61 (in other embodiments, this may come from event detecting interface 34). In some embodiments, computing device 30 then may acquire subtasks that are related portions of a task of acquiring data, e.g., data about the event. These portions may be created, generated, retrieved, or received (this process is not pictured in FIG. 1).

Referring again to FIG. 1, computing device 30 may facilitate the communication of subtasks to interface devices. This facilitation may be a direct transmission, as shown by the broken line. The line is shown as broken, however, because the facilitation of communication of subtasks to interface devices may not be a direct communication. In some embodiments, computing device 30 may provide a set of discrete interface devices, or a set of instructions, to an optional third party 5 which may distribute the subtasks to the interface devices. Optional third party 5 may include hardware, or software, or both. For example, optional third party 5 may be a web page that posts subtasks in places where they may be retrieved, or a server, which broadcasts subtasks to the devices it knows. Further possible implementations of optional third party 5 will be discussed in more detail herein.

Referring again to FIG. 1, computing device 30 may receive result data 62 of executed subtasks. Although not pictured, the result data 62 may arrive directly from the discrete interface devices, or the result data 62 may pass via a third party, which may or may not perform some processing on the subtasks.

Referring again to the example environment 100 of FIG. 1, in various embodiments, the computing device 30 may comprise, among other elements, a processor 32, a memory 33, and a user interface 35. Processor 32 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 32 may be a server. In some embodiments, processor 32 may be a distributed-core processor. Although processor 32 is depicted as a single processor that is part of a single computing device 30, in some embodiments, processor 32 may be multiple processors distributed over one or many computing devices 30, which may or may not be configured to work together. Processor 32 is illustrated as being configured to execute computer readable instructions in order to execute one or more operations described above, and as illustrated in FIGS. 5, 6A-6E, 7A-7B, 8A-8E, and 9A-9B. In some embodiments, processor 32 is designed to be configured to operate as the subtask processing module 50, which may include event occurrence detection module 52, event related information task-portion to be carried out by multiple discrete interface device subtask acquisition module 54, subtask transmission to discrete interface devices facilitating module 56, and discrete interface device subtask result data receiving module 58.

As described above, the computing device 30 may comprise a memory 33. In some embodiments, memory 33 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 33 may be located at a single network site. In other embodiments, memory 33 may be located at multiple network sites, including sites that are distant from each other.

As described above, and with reference to FIG. 1, computing device 30 may include a user interface 35. The user interface may be implemented in hardware or software, or both, and may include various input and output devices to allow an operator of a computing device 30 to interact with computing device 30. For example, user interface 35 may include, but is not limited to, an audio display, a video display, a microphone, a camera, a keyboard, a mouse, a joystick, a game controller, a touchpad, a handset, or any other device that allows interaction between a computing device and a user. The user interface 35 may also play a role in detecting events, in some embodiments, e.g., by a user pressing a button or sequence of buttons, in response to the occurrence of an event.

Figure 2B:
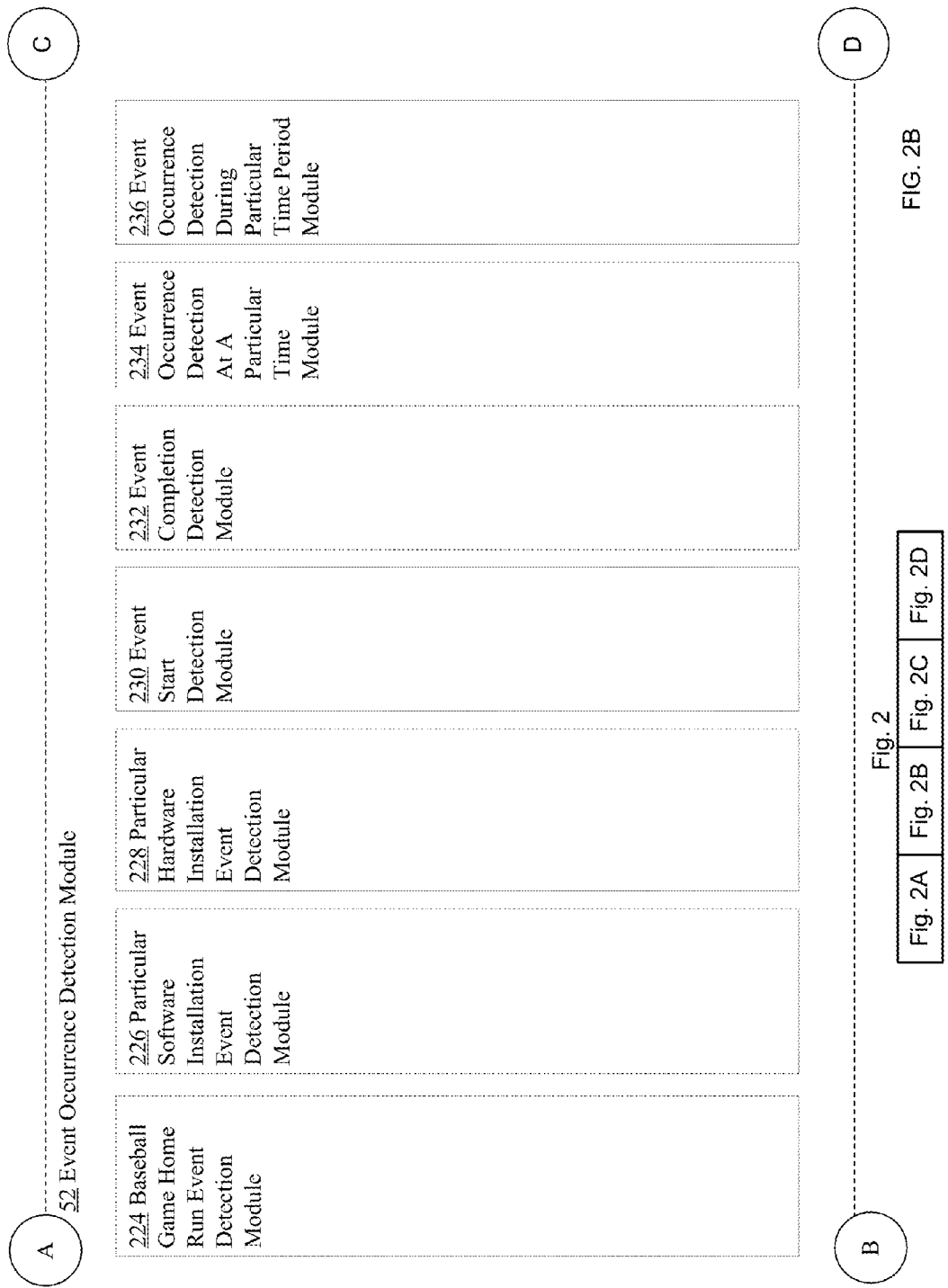

Referring now to FIG. 2, FIG. 2 illustrates an exemplary implementation of the event occurrence detection module 52. As illustrated in FIG. 2, the event occurrence detection module 52 may include one or more sub-logic modules in various alternative implementations and embodiments. For example, in some embodiments, module 52 may include an event occurrence notification receiving module 202. In some embodiments, module 202 may include an event occurrence notification receiving from communication network module 204 and a triggered indicator event occurrence notification receiving module 206. In some embodiments, module 206 may include pushed button event occurrence notification receiving module 208 and remotely triggered indicator event occurrence notification receiving module 210 (e.g., which, in some embodiments, may include remote stimulus software triggered indicator event occurrence notification receiving module 212). In some embodiments, module 52 may further include condition indicating event occurrence detection module 214. In some embodiments, module 214 may include changing light conditions indicating solar eclipse detecting module 216, aerial volcanic ash indicating volcanic eruption module 218, and increasing audience noise level indicating event of interest module 220 (e.g., which, in some embodiments, may include additional area information indicating that increasing noise level due to band module 222).

Referring again to FIG. 2, in some embodiments, event occurrence detection module 52 may further include baseball game home run event detection module 224, particular software installation event detection module 226, particular hardware installation event detection module 228, event start detection module 230, event completion detection module 232, event occurrence detection at a particular time module 234, and event occurrence detection during particular time period module 236.

Referring again to FIG. 2, in some embodiments, event occurrence detection module 52 may further include event occurrence detection at particular location module 238 and event having particular property occurrence detection module 240. In some embodiments, module 240 may include event affecting particular number of people occurrence detection module 242, event visible to particular number of people occurrence detection module 244, natural disaster event occurrence detection module 246 (e.g., which, in some embodiments, may include earthquake event occurrence detection module 248), and man-made structure failure event occurrence detection module (e.g., which, in some embodiments, may include power grid portion failure event occurrence detection module 252, cellular radio tower outage event occurrence detection module 254, and wireless radio structure outage event occurrence detection module 256).

Referring again to FIG. 2, in some embodiments, event occurrence detection module 52 may further include product or service shortage event occurrence detection module 258 (e.g., which, in some embodiments, may include food shortage event occurrence detection module 260 and vaccine shortage event occurrence detection module 262), particular person in particular location event occurrence detection module 264 (e.g., which, in some embodiments, may include rock star in restaurant event occurrence detection module 266), notification of event occurrence from discrete interface device receiving module 268, and event occurrence verification module 270 (e.g., which, in some embodiments, may include event occurrence verification by receiving notification from sensor module 272 and event occurrence verification by receiving notification from more interface devices module 274.

Figure 3A:
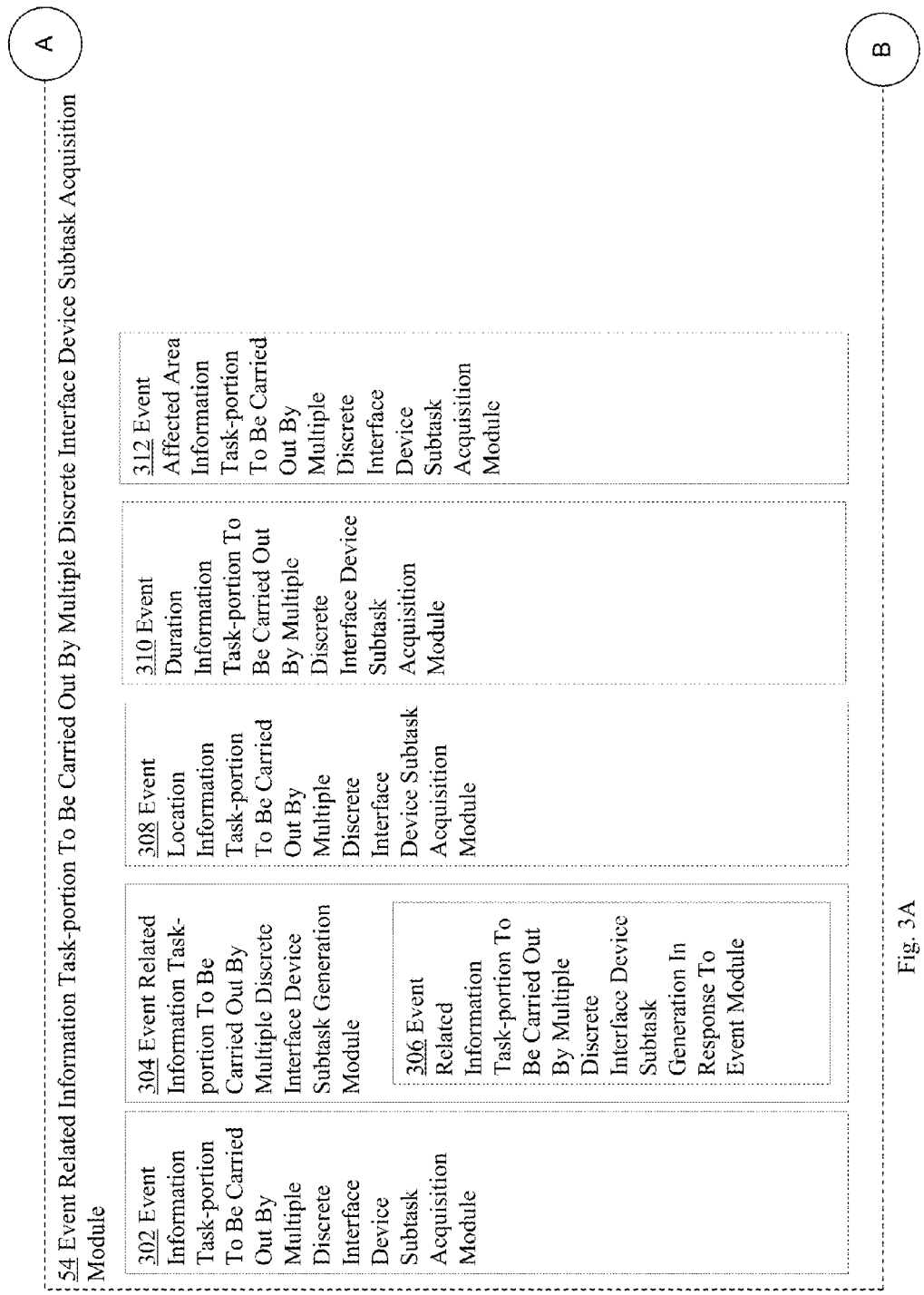
FIG. 3A, including

Referring now to FIG. 3A, FIG. 3A illustrates an exemplary implementation of the event related information task-portion to be carried out by multiple discrete interface device subtask acquisition module 54. As illustrated in FIG. 3A, the event related information task-portion to be carried out by multiple discrete interface device subtask acquisition module 54 may include one or more sub-logic modules in various alternative implementations and embodiments. For example, in some embodiments, module 54 may include event information task-portion to be carried out by multiple discrete interface device subtask acquisition module 302, event related information task-portion to be carried out by multiple discrete interface device subtask generation module 304 (e.g., which, in some embodiments, may include event related information task-portion to be carried out by multiple discrete interface device subtask generation in response to event module 306), event location information task-portion to be carried out by multiple discrete interface device subtask acquisition module 308, event duration information task-portion to be carried out by multiple discrete interface device subtask acquisition module 310, and event affected area information task-portion to be carried out by multiple discrete interface device subtask acquisition module 312.

Referring again to FIG. 3A, in some embodiments, module 54 may include event visual information task-portion to be carried out by multiple discrete interface device subtask acquisition module 314, event impacted person information task-portion to be carried out by multiple discrete interface device subtask acquisition module 316, and event response information task-portion to be carried out by multiple discrete interface device subtask acquisition module 318.

Figure 3B:
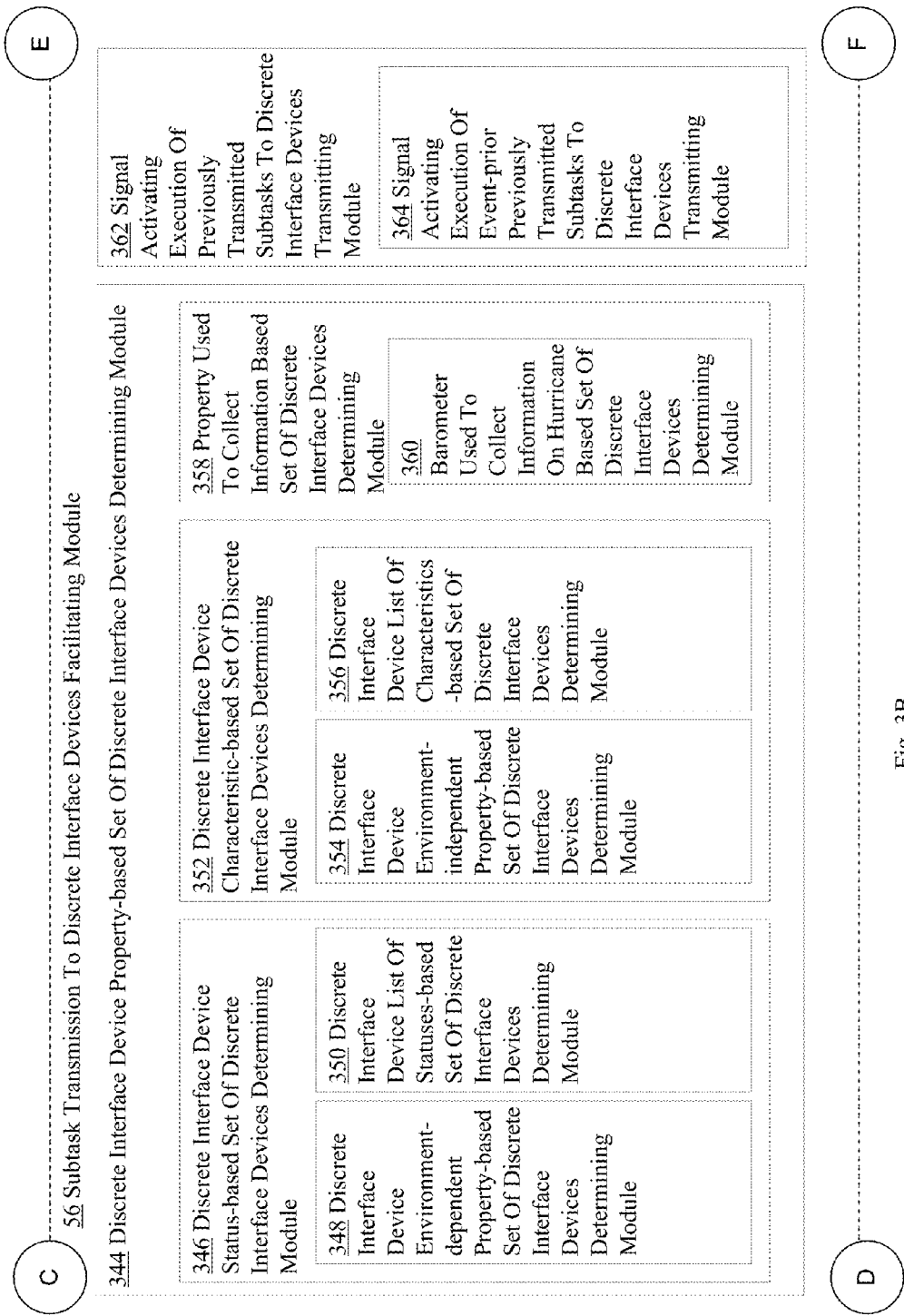
FIG. 3B, including

Referring now to FIG. 3B, FIG. 3B illustrates an exemplary implementation of the subtask transmission to discrete interface devices facilitating module 56. As illustrated in FIG. 3B, the subtask transmission to discrete interface devices facilitating module 56 may include one or more sub-logic modules in various alternative implementations and embodiments. For example, in some embodiments, module 56 may include subtask to discrete interface devices transmitting module 322, subtask to discrete interface device transmitting-configured location transmitting module 324, subtask to received set of discrete interface devices transmitting module 326, subtask to location configured to distribute subtasks to discrete interface devices transmitting module 328, subtask to location where discrete interface devices are configured to receive subtasks transmitting module 330, and subtask transmitting to location that visibly displays subtasks to two or more discrete interface devices module 332.

Referring again to FIG. 3B, in some embodiments, module 56 may include subtask to location configured to allow discrete interface devices to receive the subtask transmitting module 334, subtask to location configured to assign subtask to discrete interface devices transmitting module 336, and set of two or more discrete interface devices event-based transmission determining module 338 (e.g., which, in some embodiments, may include set of two or more discrete interface devices event location-based transmission determining module 340 and set of two or more discrete interface devices event type-based transmission determining module 342).

Referring again to FIG. 3B, in some embodiments, module 56 may include discrete interface device property-based set of discrete interface devices determining module 344. Module 344 may include discrete interface device status-based set of discrete interface devices determining module 346 (e.g., which, in some embodiments, may include discrete interface device environment-dependent property-based set of discrete interface devices determining module 348 and discrete interface device list of statuses-based set of discrete interface devices determining module 350), discrete interface device characteristic-based set of discrete interface devices determining module 352 (e.g., which, in some embodiments, may include 354 discrete interface device environment-independent property-based set of discrete interface devices determining module 354 and discrete interface device list of characteristics-based set of discrete interface devices determining module 356, and property used to collect information based set of discrete interface devices determining module 358 (e.g., which, in some embodiments, may include barometer used to collect information on hurricane based set of discrete interface devices determining module 360. In some embodiments, module 56 may further include signal activating execution of previously transmitted subtasks to discrete interface devices transmitting module 362. In some embodiments, module 362 may include signal activating execution of event-prior previously transmitted subtasks to discrete interface devices transmitting module 364.

Referring again to FIG. 3B, in some embodiments, module 56 may include signal including subtask receiving instructions transmitting to discrete interface devices module 366, signal including instructions to prepare for subtask receipt transmitting to discrete interface devices module 368, and signal requesting information regarding whether discrete interface devices were affected by the event transmitting module 370.

Referring now to FIG. 4, FIG. 4 illustrates an exemplary implementation of the discrete interface device subtask result data receiving module 58. As illustrated in FIG. 4, the discrete interface device subtask result data receiving module 58 may include one or more sub-logic modules in various alternative implementations and embodiments. For example, in some embodiments, module 58 may include discrete interface device executing subtask in absence of information regarding task requestor and/or event result data receiving module 402 (e.g., which, in some embodiments, may include discrete interface device executing subtask with incomplete information regarding task requestor and/or event result data receiving module 404, discrete interface device executing subtask with insufficient information regarding task requestor and/or event result data receiving module 406, and discrete interface device executing subtask with less information regarding task requestor and/or event result data receiving module 408), each of two or more discrete interface devices subtask result data receiving module 410, each of two or more discrete interface devices subtask result data receiving directly from two or more discrete interface devices module 412, and each of two or more discrete interface devices subtask result data receiving from third party module 414.

Figure 5:
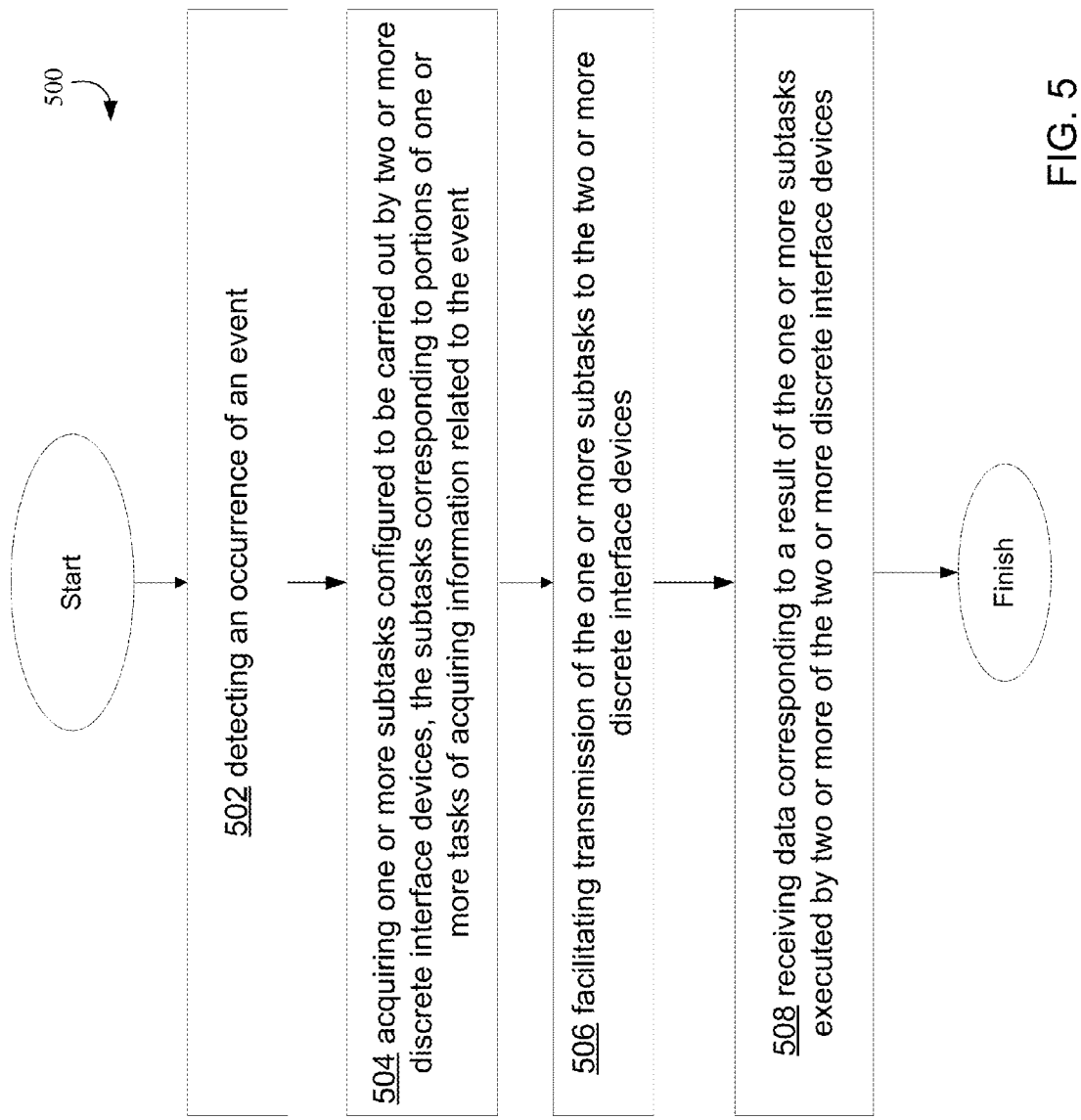
FIG. 5 is a high-level logic flowchart of a process, e.g., operational flow 500, according to an embodiment.

A more detailed discussion related to computing device 30 of FIG. 1 now will be provided with respect to the processes and operations to be described herein. Referring now to FIG. 5, FIG. 5 illustrates an operational flow 500 representing example operations for, among other methods, detecting an occurrence of an event, acquiring one or more subtasks configured to be carried out by two or more discrete interface devices, the subtasks corresponding to portions of one or more tasks of acquiring information related to the event, facilitating transmission of the one or more subtasks to the two or more discrete interface devices, and receiving data corresponding to a result of the one or more subtasks executed by two or more of the two or more discrete interface devices. In FIG. 5 and in the following figures that include various examples of operational flows, discussions and explanations will be provided with respect to the exemplary environment 100 as described above and as illustrated in FIG. 1, and with respect to other examples (e.g., as provided in FIGS. 2-4) and contexts. It should be understood that the operational flows may be executed in a number of other environments and contexts, and/or in modified versions of the systems shown in FIGS. 2-4. Although the various operational flows are presented in the sequence(s) illustrated, it should be understood that the various operations may be performed in other orders other than those which are illustrated, or may be performed concurrently.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein may be performed by at least one of a machine, an article of manufacture, or a composition of matter.

It is noted that, for the examples set forth in this application, the tasks and subtasks are commonly represented by short strings of text. This representation is merely for ease of explanation and illustration, and should not be considered as defining the format of tasks and subtasks. Rather, in various embodiments, the tasks and subtasks may be stored and represented in any data format or structure, including numbers, strings, Booleans, classes, methods, complex data structures, and the like.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

Portions of this application may reference trademarked companies and products merely for exemplary purposes. All trademarks remain the sole property of the trademark owner, and in each case where a trademarked product or company is used, a similar product or company may be replaced.

Referring again to FIG. 5, FIG. 5 shows operation 500 that includes operation 502 depicting detecting an occurrence of an event. For example, FIG. 1 shows event occurrence detection module 52 detecting (e.g., receiving notification, either from an external signal, or an internal signal, e.g., from a sensor) an occurrence of an event (e.g., an earthquake). It is noted that here, an event refers to an earthquake, which is a large event that potentially may affect many people. This is used merely for exemplary purposes, however, and the use of the term "event" should be understood to include all sizes and scopes of events that may take place. A few examples are given below, and these examples also are not meant to be limiting.

Referring again to FIG. 5, FIG. 5 shows operation 500 that includes operation 504 depicting acquiring one or more subtasks configured to be carried out by two or more discrete interface devices, the subtasks corresponding to portions of one or more tasks of acquiring information related to the event. For example, FIG. 1 shows event information task-portion to be carried out by multiple discrete interface device subtask acquisition module 54 acquiring (e.g., generating, creating, receiving, or retrieving) one or more subtasks (e.g., "determine if there is power at your location") configured to be carried out by two or more discrete interface devices (e.g., an Apple iPhone 4 and a Nokia E5 cellular device), the subtasks corresponding to portions of one or more tasks of acquiring information (e.g., "determine where the earthquake has knocked out power") related to the event (e.g., the loss of power is related to the earthquake).

It is noted here that the task of acquiring information may be related to the event without actually acquiring information about the event itself. The term "related" includes, but is not limited to, determining information about impact and effect of events, as well as detecting or gathering information on secondary events, which may be triggered directly or indirectly as a result of the event.

FIG. 5 shows operation 500 that also includes operation 506 depicting facilitating transmission of the one or more subtasks to the two or more discrete interface devices. For example, FIG. 1 shows subtask transmission to discrete interface devices facilitating module 56 facilitating transmission (e.g., performing some action which aids or assists in the transmission of at least one subtask to at least one device, e.g., providing a list of receivable interface devices in the area, e.g., where it is detected that a signal can reach) of the one or more subtasks (e.g., "determine if there is power to your location") to the two or more discrete interface devices (e.g., the Apple iPhone 4 and the Nokia E5).

FIG. 5 shows operation 500 that further includes operation 508 depicting receiving data corresponding to a result of the one or more subtasks executed by two or more of the two or more discrete interface devices. For example, FIG. 1 shows discrete interface device subtask result data receiving module 58 receiving data corresponding to a result (e.g., "there is power at my location") of the one or more subtasks (e.g., "determine if there is power at your location") executed by two or more of the two or more discrete interface devices (e.g., the Apple iPhone 4 and the Nokia E5).

Figure 6A:
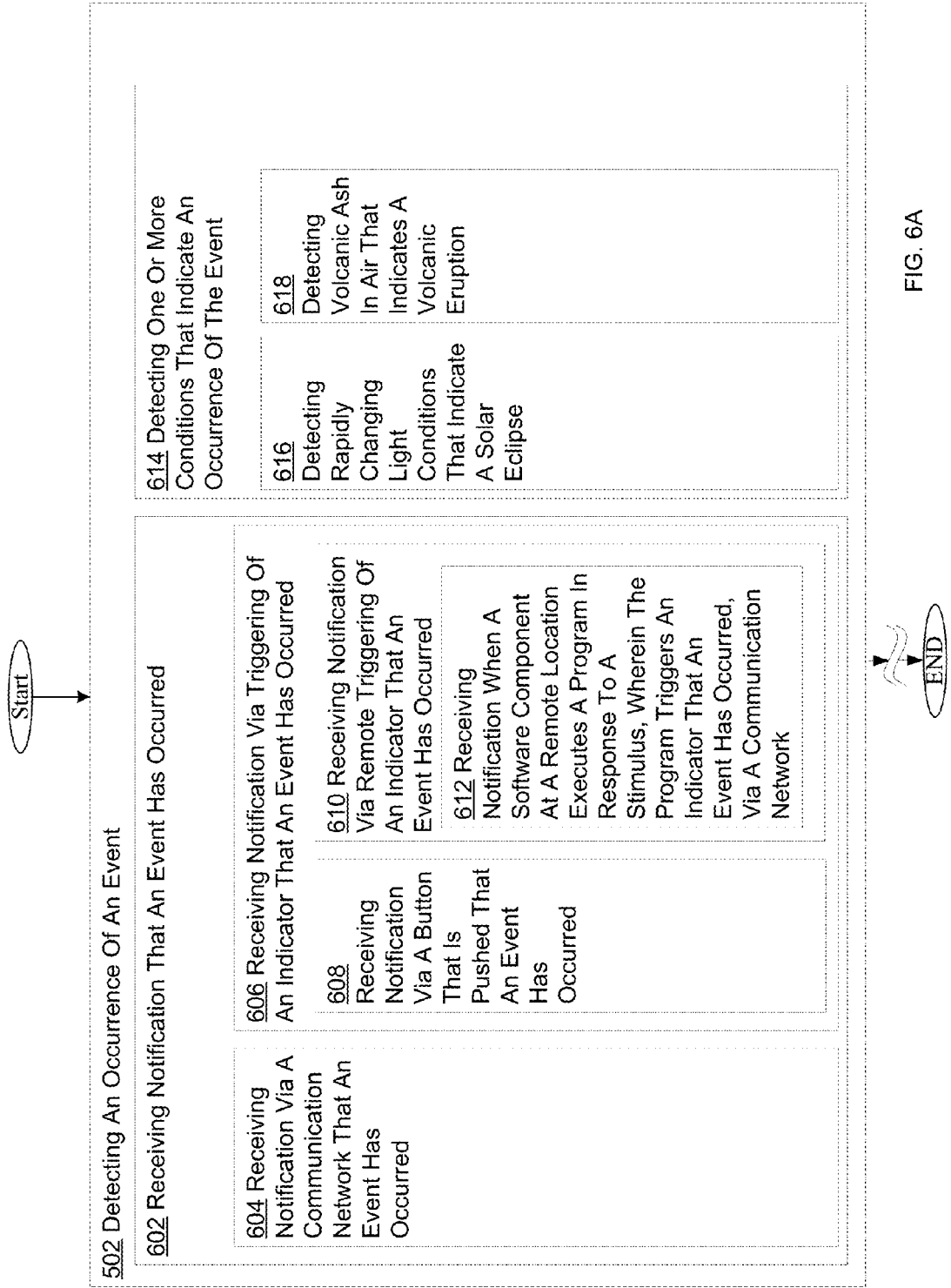
FIG. 6A is a high-level logic flowchart of a process depicting alternate implementations of an event occurrence detection operation 502 of FIG. 5.

FIGS. 6A-6E depict various implementations of operation 502, according to embodiments. Referring now to FIG. 6A, operation 502 may include operation 602 depicting receiving notification that an event has occurred. For example, FIG. 2 shows event occurrence notification receiving module 202 receiving notification (e.g., receiving a message from an observer that a tornado has formed) that an event has occurred (e.g., a tornado has formed).

Referring again to FIG. 6A, operation 602 may include operation 604 depicting receiving notification via a communication network that an event has occurred. For example, FIG. 2 shows event occurrence notification receiving from communication network module 204 receiving notification (e.g., an email) via a communication network (e.g., the Internet) that an event (e.g., a large meteorite sighting) has occurred.

Referring again to FIG. 6A, operation 602 may include operation 606 depicting receiving notification via triggering of an indicator that an event has occurred. For example, FIG. 2 shows triggered indicator event occurrence notification receiving module 206 receiving notification (e.g., a signal from a network monitoring unit that a tower has malfunctioned) via triggering of an indicator (e.g., a tower-malfunction indicator) that an event (e.g., a network communication tower has failed or malfunctioned) has occurred.

Referring again to FIG. 6A, operation 606 may include operation 608 depicting receiving notification via a button that is pushed that an event has occurred. For example, FIG. 2 shows pushed button event occurrence notification receiving module 208 receiving notification (e.g., an internal signal) via a button (e.g., a button on a machine indicating sighting of lightning in the area) that is pushed that an event (e.g., a lightning sighting) has occurred.

Referring again to FIG. 6A, operation 606 may include operation 610 depicting receiving notification via remote triggering of an indicator that an event has occurred. For example, FIG. 2 shows remotely triggered indicator event occurrence notification receiving module 210 receiving notification (e.g., an automatically-generated text message) via remote triggering (e.g., a remote station sends the text message which triggers a response) of an indicator (e.g., a seismic wave) that an event (e.g., an earthquake) has occurred.

Referring again to FIG. 6A, operation 610 may include operation 612 depicting receiving notification when a software component at a remote location executes a program in response to a stimulus, wherein the program triggers an indicator that an event has occurred, via a communication network. For example, FIG. 2 shows remote stimulus software triggered indicator event occurrence notification receiving module 212 receiving notification (e.g., a packet of data sent over a TCP/IP network) when a software component (e.g., a program designed to monitor the night sky) executes a program (e.g., a program designed to notify multiple locations of an eclipse) in response to a stimulus (e.g., a rapidly changing amount of light in a particular pattern), wherein the program triggers an indicator (e.g., at a different location, by sending a packet) that an event has occurred (e.g., a lunar eclipse), via a communication network (e.g., a TCP/IP network).

Referring again to FIG. 6A, operation 502 may include operation 614 depicting detecting one or more conditions that indicate an occurrence of the event. For example, FIG. 2 shows condition indicating event occurrence detecting module detecting one or more conditions (e.g., rapidly dropping barometric pressure) that indicate an occurrence of the event (e.g., a hurricane).

Referring again to FIG. 6A, operation 614 may include operation 616 depicting detecting rapidly changing light conditions that indicate a solar eclipse. For example, FIG. 2 shows changing light conditions indicating solar eclipse detecting module 216 detecting rapidly changing light conditions (e.g., a bright day suddenly darkens in a manner indicative of an eclipse) that indicate a solar eclipse (e.g., the event).

Referring again to FIG. 6A, operation 614 may include operation 618 depicting detecting volcanic ash in air that indicates a volcanic eruption. For example, FIG. 2 shows aerial volcanic ash indicating volcanic eruption module 218 detecting volcanic ash (e.g., a two-step detection, first through an air quality meter, then through an analysis of the material in the air) that indicates a volcanic eruption (e.g., the event).

Figure 6B:
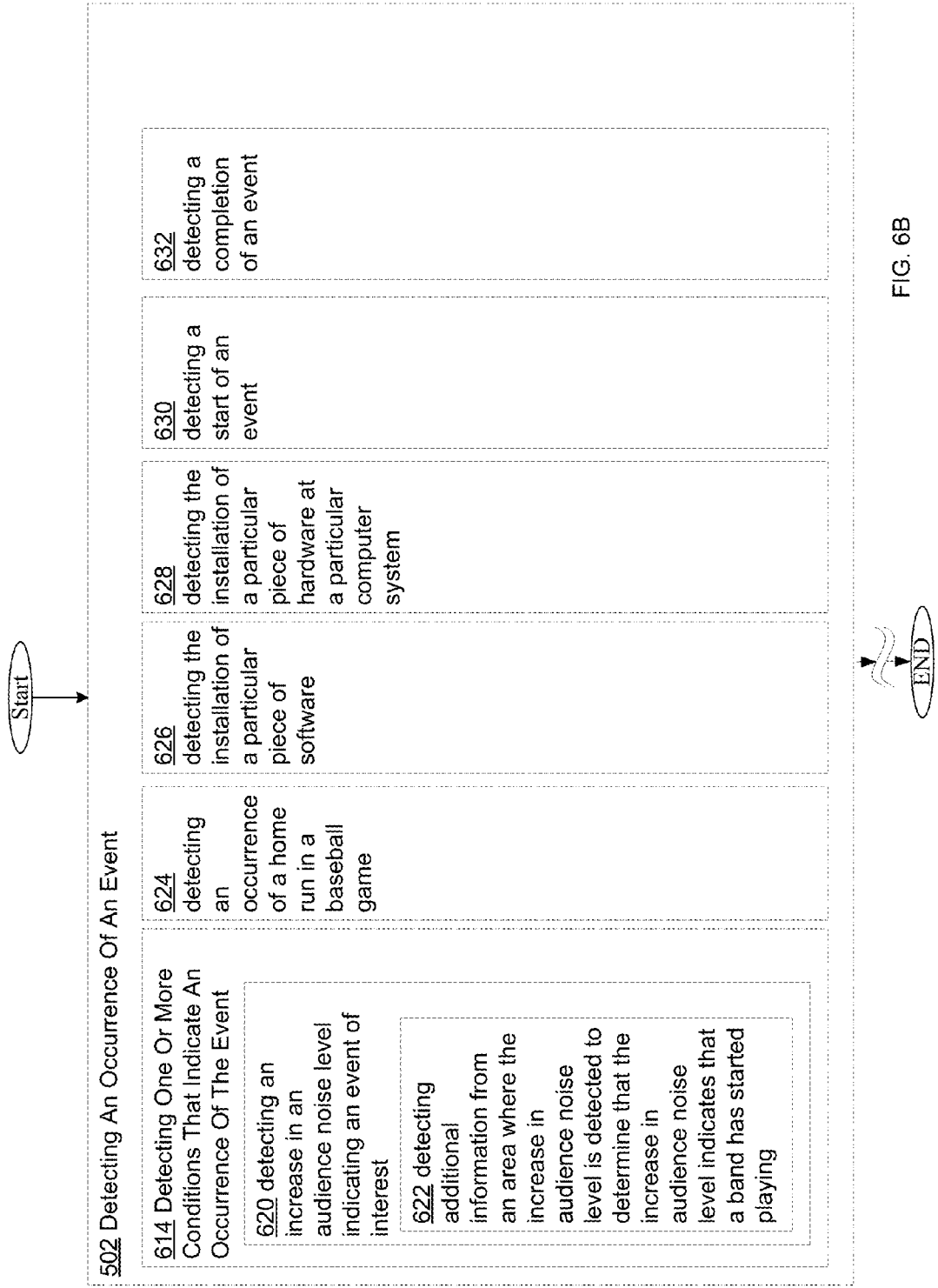
FIG. 6B is a high-level logic flowchart of a process depicting alternate implementations of an event occurrence detection operation 502 of FIG. 5.

Referring now to FIG. 6B, operation 614 may include operation 620 depicting detecting an increase in an audience noise level indicating an event of interest. For example, FIG. 2 shows increasing audience noise level indicating event of interest module 220 detecting an increase in an audience noise level (e.g., determined using a microphone or multiple microphones at an event, and also, in some embodiments, coupled with a noise analyzer) indicating an event of interest (e.g., a touchdown is scored in a football game).

Referring again to FIG. 6B, operation 620 may include operation 622 depicting detecting additional information from an area where the increase in audience noise level is detected to determine that the increase in audience noise level indicates that a band has started playing. For example, FIG. 2 shows additional area information indicating that increasing audience noise level due to band module 222 detecting additional information (e.g., performing sound analysis to determine clapping vs. music playing) from an area where the increase in audience noise level is detected (e.g., inside the theater) to determine that the increase in audience noise level indicates that a band has started playing (e.g., determining if music is playing or if it is just noise from the crowd).

Referring again to FIG. 6B, operation 502 may include operation 624 depicting detecting an occurrence of a home run in a baseball game. For example, FIG. 2 shows baseball game home run event detection module 224 detecting an occurrence of a home run in a baseball game (e.g., by tracking the baseball, or by capturing a video or Jumbotron feed, or being alerted by the scorekeeper pressing a button or keying in a specific keystroke to indicate "home run").

Referring again to FIG. 6B, operation 502 may include operation 626 depicting detecting the installation of a particular piece of software at a particular computer system. For example, FIG. 2 shows particular software installation event detection module 226 detecting the installation of a particular piece of software (e.g., a virus) at a particular computer system (e.g., a core piece of network technology).

Referring again to FIG. 6B, operation 502 may include operation 628 depicting detecting the installation of a particular piece of hardware at a particular computer system. For example, FIG. 2 shows particular hardware installation event detection module 228 detecting the installation of a particular piece of hardware (e.g., an Intel chip) at a particular computer system (e.g., at a system of a potential business customer).

Referring again to FIG. 6B, operation 502 may include operation 630 depicting detecting a start of an event. For example, FIG. 2 shows event start detection module 230 detecting a start (e.g., the beginning, e.g., the first seismic waves from an earthquake) of an event (e.g., an earthquake).

Referring again to FIG. 6B, operation 502 may include operation 632 depicting detecting a completion of an event. For example, FIG. 2 shows event completion detection module 232 detecting a completion (e.g., the end, e.g., the point at which tornado-force winds subside) of an event (e.g., a tornado).

Figure 6C:
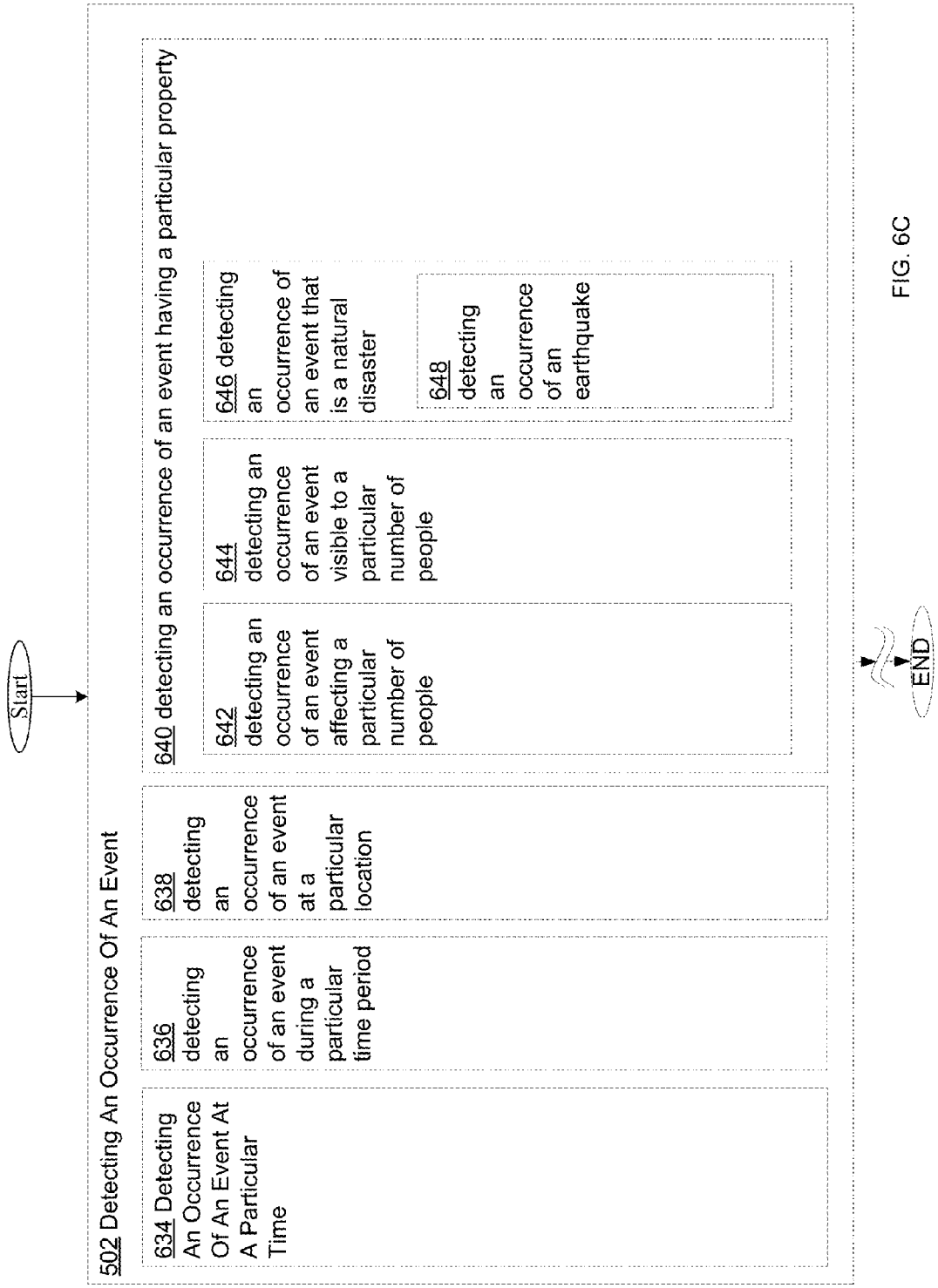
FIG. 6C is a high-level logic flowchart of a process depicting alternate implementations of an event occurrence detection operation 502 of FIG. 5.

Referring now to FIG. 6C, operation 502 may include operation 634 depicting detecting an occurrence of an event at a particular time. For example, FIG. 2 shows event occurrence detection at a particular time module 234 detecting an occurrence of an event (e.g., an appearance of an antiparticle) at a particular time (e.g., seven nanoseconds after a particle collision at a supercollider).

Referring again to FIG. 6C, operation 502 may include operation 636 depicting detecting an occurrence of an event during a particular time period. For example, FIG. 2 shows event occurrence detection during particular time period module 236 detecting an occurrence of an event (e.g., a missile is launched) during a particular time period (e.g., between seven and nine p.m.).

Referring again to FIG. 6C, operation 502 may include operation 638 depicting detecting an occurrence of an event at a particular location. For example, FIG. 2 shows event occurrence detection at particular location module 238 detecting an occurrence of an event (e.g., a Russian sub appears) at a particular location (e.g., within United States territorial waters).

Referring again to FIG. 6C, operation 502 may include operation 640 depicting detecting an occurrence of an event having a particular property. For example, FIG. 2 shows event having particular property occurrence detection module 240 detecting an occurrence of an event (e.g., a water shortage) having a particular property (e.g., "inside the state of California").

Referring again to FIG. 6C, operation 640 may include operation 642 depicting detecting an occurrence of an event affecting a particular number of people. For example, FIG. 2 shows event affecting particular number of people occurrence detection module 242 detecting an occurrence of an event (e.g., a power outage) affecting a particular number of people (e.g., more than 250,000 people).

Referring again to FIG. 6C, operation 640 may include operation 644 depicting detecting an occurrence of an event visible to a particular number of people. For example, FIG. 2 shows event visible to particular number of people occurrence detection module 244 detecting an occurrence of an event (e.g., a total solar eclipse) visible to a particular number of people (e.g., less than 100 people, e.g., such that observation data should be recorded by anyone who is able to see it).

Referring again to FIG. 6C, operation 640 may include operation 646 depicting detecting an occurrence of an event that is a natural disaster. For example, FIG. 2 shows natural disaster event occurrence detection module 246 detecting an occurrence of an event that is a natural disaster (e.g., a tsunami).

Referring again to FIG. 6C, operation 646 may include operation 648 depicting detecting an occurrence of an earthquake. For example, FIG. 2 shows earthquake event occurrence detection module 248 detecting an occurrence of an earthquake (e.g., the event).

Figure 6D:
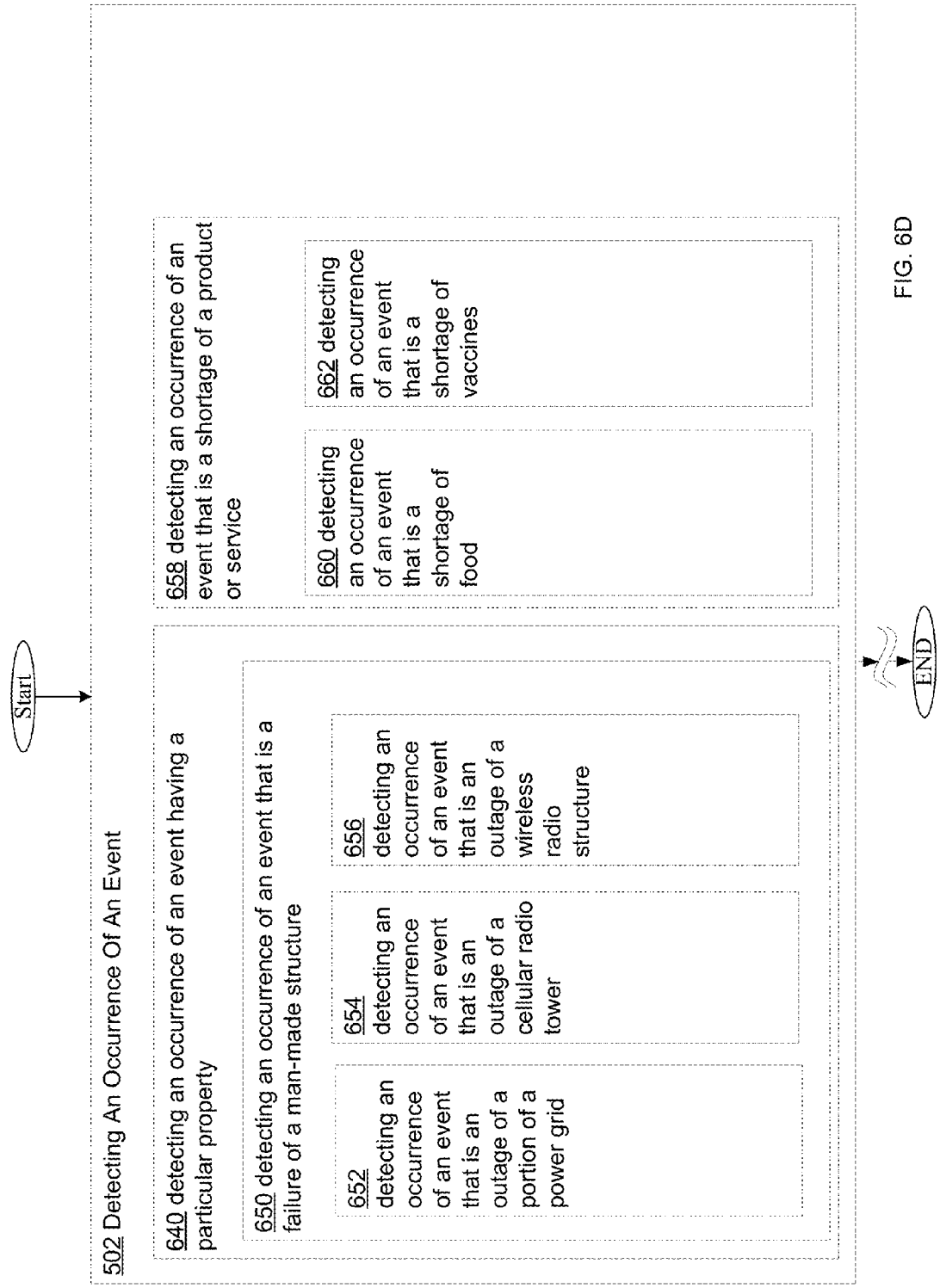
FIG. 6D is a high-level logic flowchart of a process depicting alternate implementations of an event occurrence detection operation 502 of FIG. 5.

Referring now to FIG. 6D, operation 640 may include operation 650 depicting detecting an occurrence of an event that is a failure of a man-made structure. For example, FIG. 2 shows man-made structure failure event occurrence detection module 250 detecting an occurrence of an event (e.g., a nuclear reactor cooling station failure) that is a failure (e.g., a part has partially or completely malfunctioned, rendering the structure partially or wholly unable to complete the function for which it was designed) of a man-made structure (e.g., a nuclear power plant).

Referring again to FIG. 6D, operation 650 may include operation 652 depicting detecting an occurrence of an event that is an outage of a portion of a power grid. For example, FIG. 2 shows power grid portion failure event occurrence detection module 252 detecting an occurrence of an event (e.g., detecting that power has been lost) that is an outage (e.g., due to a tower failure, or a transformer failure, or a brown-out, or an overload, or a conscious decision to prevent flow of power to an area) of a portion of a power grid (e.g., it could be as small as a single structure, or as large as the entire grid).

Referring again to FIG. 6D, operation 650 may include operation 654 depicting detecting an occurrence of an event that is an outage of a cellular radio tower. For example, FIG. 2 shows cellular radio tower outage event occurrence detection module 254 detecting (e.g., receiving a signal that the event has occurred) an occurrence of an event that is an outage of a cellular radio tower (e.g., the cellular tower has stopped providing service).

Referring again to FIG. 6D, operation 650 may include operation 656 depicting detecting an occurrence of an event that is an outage of a wireless radio structure. For example, FIG. 2 shows wireless radio structure outage event occurrence detection module 256 detecting (e.g., inferring from a sudden lack of coverage) an occurrence of an event that is an outage of a wireless radio structure (e.g., a router, a public access point, a satellite, or any piece of equipment used to send and receive data via a wireless radio (e.g., wireless Internet).

Referring again to FIG. 6D, operation 502 may include operation 658 depicting detecting an occurrence of an event that is a shortage of a product or service. For example, FIG. 2 shows product or service shortage event occurrence detection module 258 detecting (e.g., monitoring social media and determining based on tweets, blog posts, and Facebook posts) an occurrence of an event that is a shortage of a product or service (e.g., a shortage of new Apple iPhones in the Clarendon suburb of Washington, D.C.).

Referring again to FIG. 6D, operation 658 may include operation 660 depicting detecting an occurrence of an event that is a shortage of food. For example, FIG. 2 shows food shortage event occurrence detection module 260 detecting (e.g., being notified through actions carried out by a particular piece of software that monitors food supply) an occurrence of an event that is a shortage of food (e.g., no fresh bread in Los Angeles, no fresh fruit in Seattle, lack of edible goods in Amarillo, Tex.).

Referring again to FIG. 6D, operation 658 may include operation 662 depicting detecting an occurrence of an event that is a shortage of vaccines. For example, FIG. 2 shows vaccine shortage event occurrence detection module 262 detecting an occurrence (e.g., determining through statistical analysis of populations and knowledge of where vaccines are delivered) of an event that is a shortage of vaccines (e.g., flu vaccine during flu season).

Figure 6E:
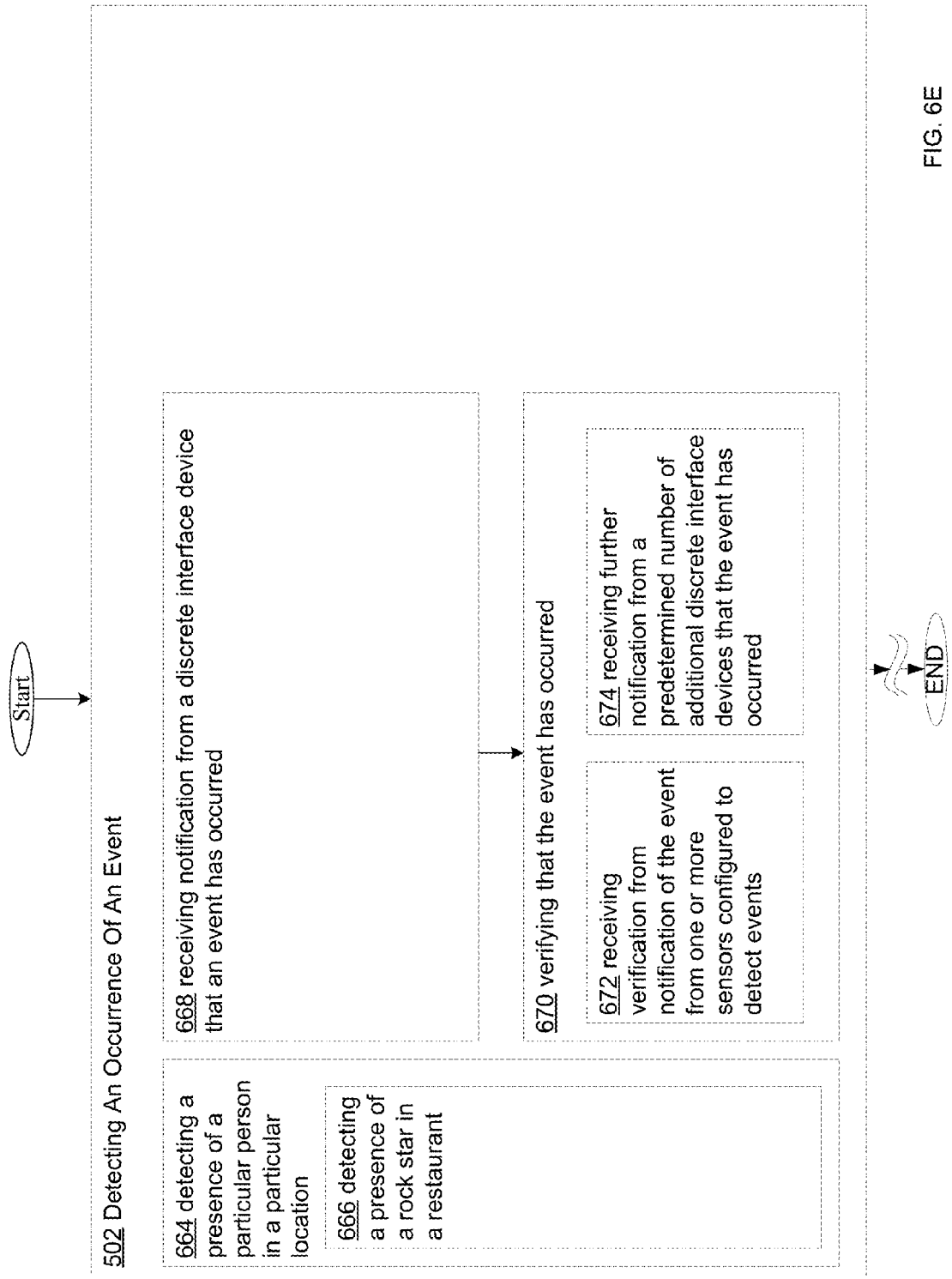
FIG. 6E is a high-level logic flowchart of a process depicting alternate implementations of an event occurrence detection operation 502 of FIG. 5.

Referring now to FIG. 6E, operation 502 may include operation 664 depicting detecting a presence of a particular person in a particular location. For example, FIG. 2 shows particular person in particular location event occurrence detection module 264 detecting a presence (e.g., tracking a person's phone, e.g., as in a military or spy operation) of a particular person (e.g., a foreign dignitary, e.g., Kofi Annan) in a particular location (e.g., in the U.S. Capitol building).

Referring again to FIG. 6E, operation 664 may include operation 666 depicting detecting a presence of a rock star in a restaurant. For example, FIG. 2 shows rock star in restaurant event occurrence detection module 266 detecting a presence of a rock star (e.g., Bono from the music group U2) in a restaurant (e.g., having lunch at Old Ebbitt's grill in Washington, D.C.).

Referring again to FIG. 6E, operation 502 may include operation 668 depicting receiving notification from a discrete interface device that an event has occurred. For example, FIG. 2 shows notification of event occurrence from discrete interface device receiving module 268 receiving notification (e.g., a message, e.g., a packet of data) from a discrete interface device (e.g., a Motorola Droid X) that an event (e.g., a snowstorm) has occurred).

Referring again to FIG. 6E, operation 502 may further include operation 670 depicting verifying that the event has occurred. For example, FIG. 2 shows event occurrence verification module 270 verifying (e.g., retrieving information from the National Weather Service ("NWS") that the event (e.g., the snowstorm) has occurred (e.g., verifying that the weather conditions also indicate snow in that vicinity, although they cannot be as accurate as a person holding a device at the actual location where snow is falling).

Referring again to FIG. 6E, operation 670 may include operation 672 depicting receiving verification from notification of the event from one or more sensors configured to detect events. For example, FIG. 2 shows event occurrence verification by receiving notification from sensor module 272 receiving verification (e.g., confirmation that a snowstorm has occurred) from notification of the event (e.g., notification that a snowstorm is occurring) from one or more sensors (e.g., precipitation sensors) configured to detect events (e.g., snowstorms).

Referring again to FIG. 6E, operation 670 may include operation 674 depicting receiving further notification from a predetermined number of additional discrete interface devices that the event has occurred. For example, FIG. 2 shows event occurrence verification by receiving notification from more interface devices module 274 receiving further notification (e.g., receiving confirmations that a snowstorm is occurring) from a predetermined number (e.g., 10) of additional discrete interface devices (e.g., other users with computers, GPS navigators, mobile devices, tablets, and the like) that the event (e.g., the snowstorm) has occurred.

Figure 7B:
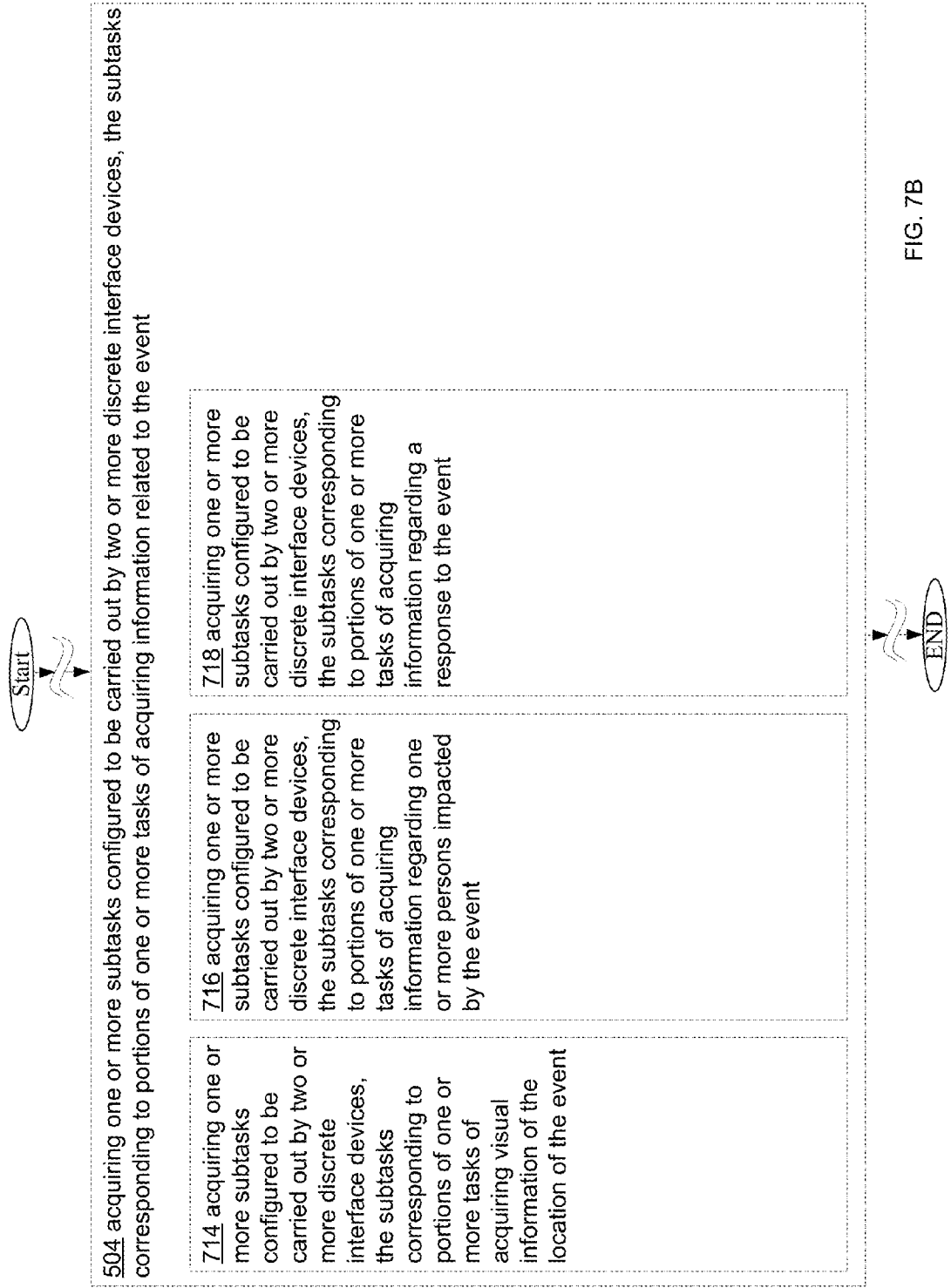
FIG. 7B is a high-level logic flowchart of a process depicting alternate implementations of a subtask acquiring operation 504 of FIG. 5.

FIGS. 7A-7B depict various implementations of operation 504, according to embodiments. Referring now to FIG. 7A, operation 504 may include operation 702 acquiring one or more subtasks configured to be carried out by two or more discrete interface devices, the subtasks corresponding to portions of a task of acquiring information about the event. For example, FIG. 3A shows event information task-portion to be carried out by multiple discrete interface device subtask acquisition module 302 acquiring one or more subtasks (e.g., "determine how much snow has fallen at your location") configured to be carried out by two or more discrete interface devices (e.g., this information becomes more useful with more discrete interface devices at different locations), the subtasks corresponding to portions of a task of acquiring information (e.g., "accurately determine the amount of snowfall in Washington D.C.") about the event (e.g., a major snowstorm in Washington D.C.)

Referring again to FIG. 7A, operation 504 may include operation 704 depicting generating one or more subtasks configured to be carried out by two or more discrete interface devices, the one or more subtasks corresponding to portions of one or more tasks of acquiring information related to the event. For example, FIG. 3A shows event related information task-portion to be carried out by multiple discrete interface device subtask generation module 304 generating (e.g., using computer power or human assisting to create) one or more subtasks (e.g., "take a picture of the lunar eclipse") configured to be carried out by two or more discrete interface devices (e.g., multiple cameras and mobile devices equipped with cameras that have different viewing angles and different cloud cover), the one or more subtasks corresponding to portions of one or more tasks of acquiring information related to the event (e.g., a composite picture including pictures from many viewing angles at many times).

Referring again to FIG. 7A, operation 704 may include operation 706 depicting generating, in response to the event, one or more subtasks configured to be carried out by two or more discrete interface devices, the one or more subtasks corresponding to portions of one or more tasks of acquiring information related to the event. For example, FIG. 3A shows event related information task-portion to be carried out by multiple discrete interface device subtask generation in response to event module 306 generating (e.g., creating or modifying existing), in response to the event, one or more subtasks (e.g., "determine how many people are trapped at your location") configured to be carried out by two or more discrete interface devices (e.g., a working terminal inside a trapped building, and a working cellular telephone carried by another person in a group of trapped people), the one or more subtasks corresponding to portions of one or more tasks (e.g., "determine where people are trapped after a large fire") of acquiring information related to the event (e.g., a large fire in Chicago). Another example that involves acquiring instead of generating, may include acquiring (e.g., receiving from a different location) one or more subtasks (e.g., "determine the air quality at your location") configured to be carried out by two or more discrete interface devices (e.g., two interface devices with air quality sensors in different locations), the subtasks corresponding to portions of one or more tasks of acquiring information (e.g., "determine where the dust potentially creates a human hazard in areas near where a building collapsed") related to the event (e.g., the building collapsed).

Referring again to FIG. 7A, operation 704 may include operation 708 depicting acquiring one or more subtasks configured to be carried out by two or more discrete interface devices, the subtasks corresponding to portions of one or more tasks of acquiring information regarding the exact location of the event. For example, FIG. 3A shows event location information task-portion to be carried out by multiple discrete interface device subtask acquisition module 308 acquiring one or more subtasks (e.g., "determine the wind speed at your current location") configured to be carried out by two or more discrete interface devices (e.g., portable devices that measure wind speed), the subtasks corresponding to portions of one or more tasks of acquiring information (e.g., "use multiple sensor points to track the movement of the eye of a hurricane, after the hurricane has passed") regarding the exact location of the event (e.g., more accurately plot the exact path of the hurricane and the various wind speeds it produces).

Referring again to FIG. 7A, operation 704 may include operation 710 depicting acquiring one or more subtasks configured to be carried out by two or more discrete interface devices, the subtasks corresponding to portions of one or more tasks of acquiring information regarding a duration of the event. For example, FIG. 3A shows event duration information task-portion to be carried out by multiple discrete interface device subtask acquisition module 310 acquiring one or more subtasks (e.g., "send a message when your power is restored") configured to be carried out by two or more discrete interface devices (e.g., an Apple iPhone and a Samsung Galaxy Tab), the subtasks corresponding to portions of one or more tasks of acquiring information (e.g., "determine, on a rolling basis, exactly when power is restored") regarding a duration (e.g., a length of time) of the event (e.g., a power outage).

Referring again to FIG. 7A, operation 704 may include operation 712 depicting acquiring one or more subtasks configured to be carried out by two or more discrete interface devices, the subtasks corresponding to portions of one or more tasks of acquiring information regarding an area affected by the event. For example, FIG. 3A shows event affected area information task-portion to be carried out by multiple discrete interface device subtask acquisition module 312 acquiring one or more subtasks (e.g., "determine the air quality at your location") configured to be carried out by two or more discrete interface devices (e.g., two mobile devices with air quality sensors and internet connections), the subtasks corresponding to portions of one or more tasks of acquiring information (e.g., "determine the air quality in the neighborhoods of downtown Seattle") regarding an area affected by the event (e.g., an initial detection of abnormally high pollen count).

Referring now to FIG. 7B, operation 704 may include operation 714 depicting acquiring one or more subtasks configured to be carried out by two or more discrete interface devices, the subtasks corresponding to portions of one or more tasks of acquiring visual information of the location of the event. For example, FIG. 3A shows event visual information task-portion to be carried out by multiple discrete interface device subtask acquisition module 314 acquiring one or more subtasks (e.g., "take a picture as close as you can get to the earthquake site") configured to be carried out by two or more discrete interface devices (e.g., the Apple iPhone and the Acer Iconia), the subtasks corresponding to portions of one or more tasks of acquiring visual information (e.g., real-time updating pictures from multiple angles) of the location of the event (e.g., the earthquake).

Referring again to FIG. 7B, operation 704 may include operation 716 depicting acquiring one or more subtasks configured to be carried out by two or more discrete interface devices, the subtasks corresponding to portions of one or more tasks of acquiring information regarding one or more persons impacted by the event. For example, FIG. 3A shows event impacted person information task-portion to be carried out by multiple discrete interface device subtask acquisition module 316 acquiring one or more subtasks (e.g., "determine how many people are waiting in line for a vaccine at the nearest vaccine location to you") configured to be carried out by two or more discrete interface devices (e.g., Kindle Fire and BlackBerry Playbook tablets), the subtasks corresponding to portions of one or more tasks of acquiring information (e.g., "accurately determine the demand for vaccines at particular locations") regarding one or more persons impacted by the event (e.g., the people waiting for vaccines).

Referring again to FIG. 7B, operation 704 may include operation 718 depicting acquiring one or more subtasks configured to be carried out by two or more discrete interface devices, the subtasks corresponding to portions of one or more tasks of acquiring information regarding a response to the event. For example, FIG. 3A shows event response information task-portion to be carried out by multiple discrete interface device subtask acquisition module 318 acquiring one or more subtasks (e.g., "determine how many fire trucks are in your area currently by taking a picture of the area") configured to be carried out by two or more discrete interface devices (e.g., a Canon PowerShot SD430 Wireless Digital Camera and an Asus EeePc), the subtasks corresponding to portions of one or more tasks of acquiring information (e.g., "develop a graphical map of fire truck deployment") regarding a response (e.g., an emergency response) to the event (e.g., a large explosion in a major city).

Figure 8A:
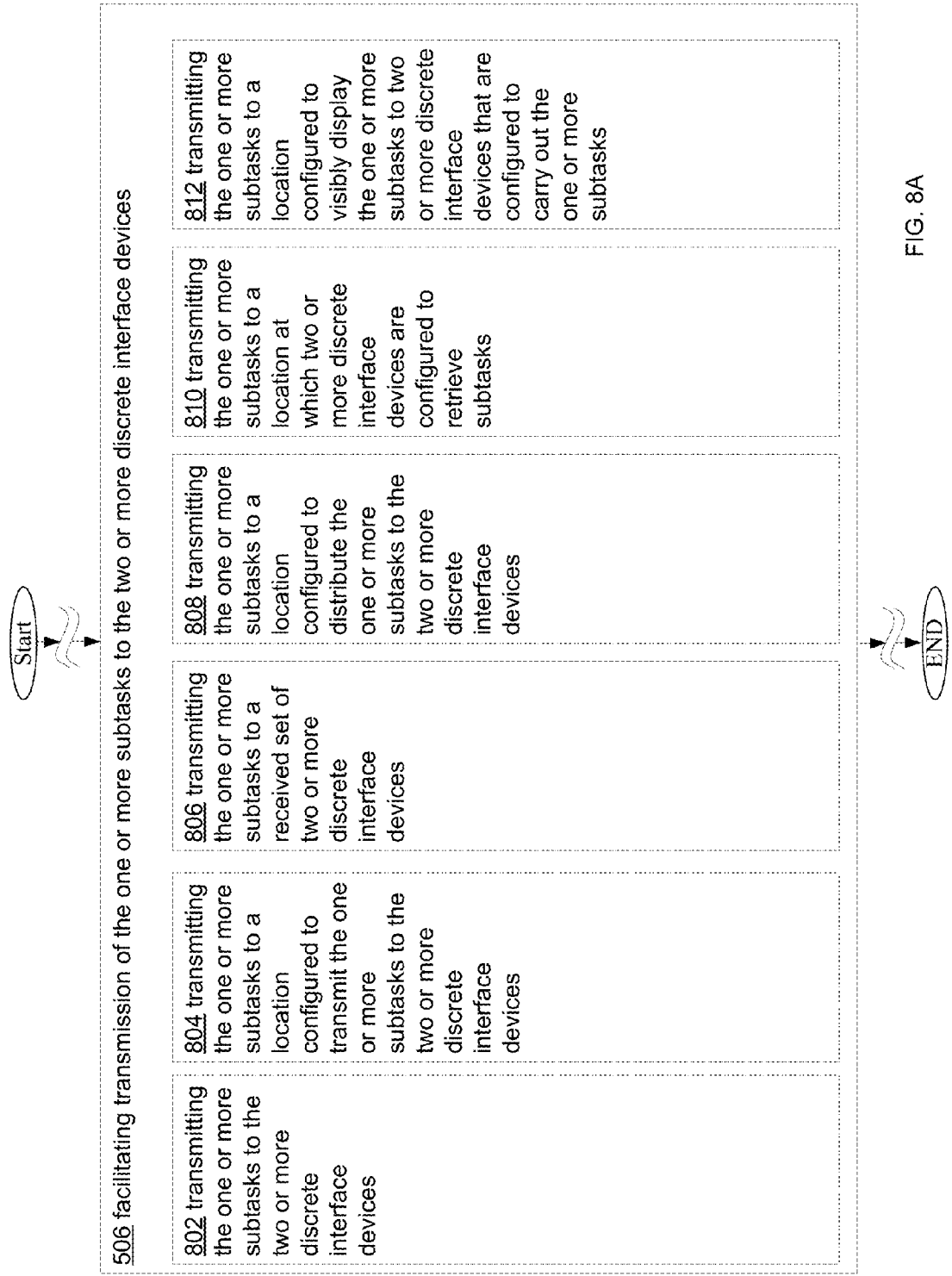
FIG. 8A is a high-level logic flowchart of a process depicting alternate implementations of a transmission facilitating operation 506 of FIG. 5.

FIGS. 8A-8E depict various implementations of operation 506, according to embodiments. Referring now to FIG. 8A, operation 506 may include operation 802 depicting transmitting the one or more subtasks to the two or more discrete interface devices. For example, FIG. 3B shows subtask to discrete interface devices transmitting module 322 transmitting (e.g., sending across a local or remote communication network) the one or more subtasks (e.g., "rank, on a scale of 1-10, the seriousness of your current situation") to the two or more discrete interface devices (e.g., a Motorola Droid X and a Palm Pre Plus).

Referring again to FIG. 8A, operation 506 may include operation 804 depicting transmitting the one or more subtasks to a location configured to transmit the one or more subtasks to the two or more discrete interface devices. For example, FIG. 3B shows subtask to discrete interface device transmitting-configured location transmitting module 324 transmitting the one or more subtasks (e.g., "determine the relative humidity at your location") to a location (e.g., a third party server run by AT&T) configured to transmit the one or more subtasks to the two or more discrete interface devices (e.g., two mobile devices and tablets connected via the AT&T network).

Referring again to FIG. 8A, operation 506 may include operation 806 depicting transmitting the one or more subtasks to a received set of two or more discrete interface devices. For example, FIG. 3B shows subtask to received set of discrete interface devices transmitting module 326 transmitting the one or more subtasks (e.g., "determine the temperature at your location") to a received (e.g., received from an entity that keeps a list of discrete interface devices, e.g., receiving a list of eligible iPhones, iPads, and iPod Touches from Apple) set of two or more discrete interface devices (e.g., Apple's iPhone 4S and iPad 2).

Referring again to FIG. 8A, operation 506 may include operation 808 depicting transmitting the one or more subtasks to a location configured to distribute the one or more subtasks to the two or more discrete interface devices. For example, FIG. 3B shows subtask to location configured to distribute subtasks to discrete interface devices transmitting module 328 transmitting the one or more subtasks to a location configured to distribute the one or more subtasks (e.g., "take a picture of your surroundings after the event is finished occurring") to a location configured to distribute the one or more subtasks (e.g., Twitter, which is configured to distribute those instructions to two or more discrete interface devices) to the two or more discrete interface devices (e.g., multiple computers and devices that are logged into Twitter).

Referring again to FIG. 8A, operation 506 may include operation 810 depicting transmitting the one or more subtasks to a location at which two or more discrete interface devices are configured to retrieve subtasks. For example, FIG. 3B shows subtask to location where discrete interface devices are configured to receive subtasks transmitting module 330 transmitting the one or more subtasks (e.g., "determine how many people are in line to purchase food") to a location (e.g., a server where mobile devices are configured to look for subtasks) at which two or more discrete interface devices (e.g., multiple Samsung Nexus smartphones) are configured to retrieve subtasks.

Referring again to FIG. 8A, operation 506 may include operation 812 depicting transmitting the one or more subtasks to a location configured to visibly display the one or more subtasks to two or more discrete interface devices that are configured to carry out the one or more subtasks. For example, FIG. 3B shows subtask transmitting to location that visibly displays subtasks to two or more discrete interface devices module 332 transmitting the one or more subtasks to a location (e.g., posting the one or more subtasks to a designed web page, e.g., a Facebook page) configured to visibly display (e.g., display on a page, although the discrete interface device does not need to "visibly" see the page to download/read it) the one or more subtasks (e.g., "measure the temperature at your location every five minutes for one hour") to two or more discrete interface devices (e.g., two or more smartphones with thermometers) that are configured to carry out the one or more subtasks (e.g., that have thermometers).

Figure 8B:
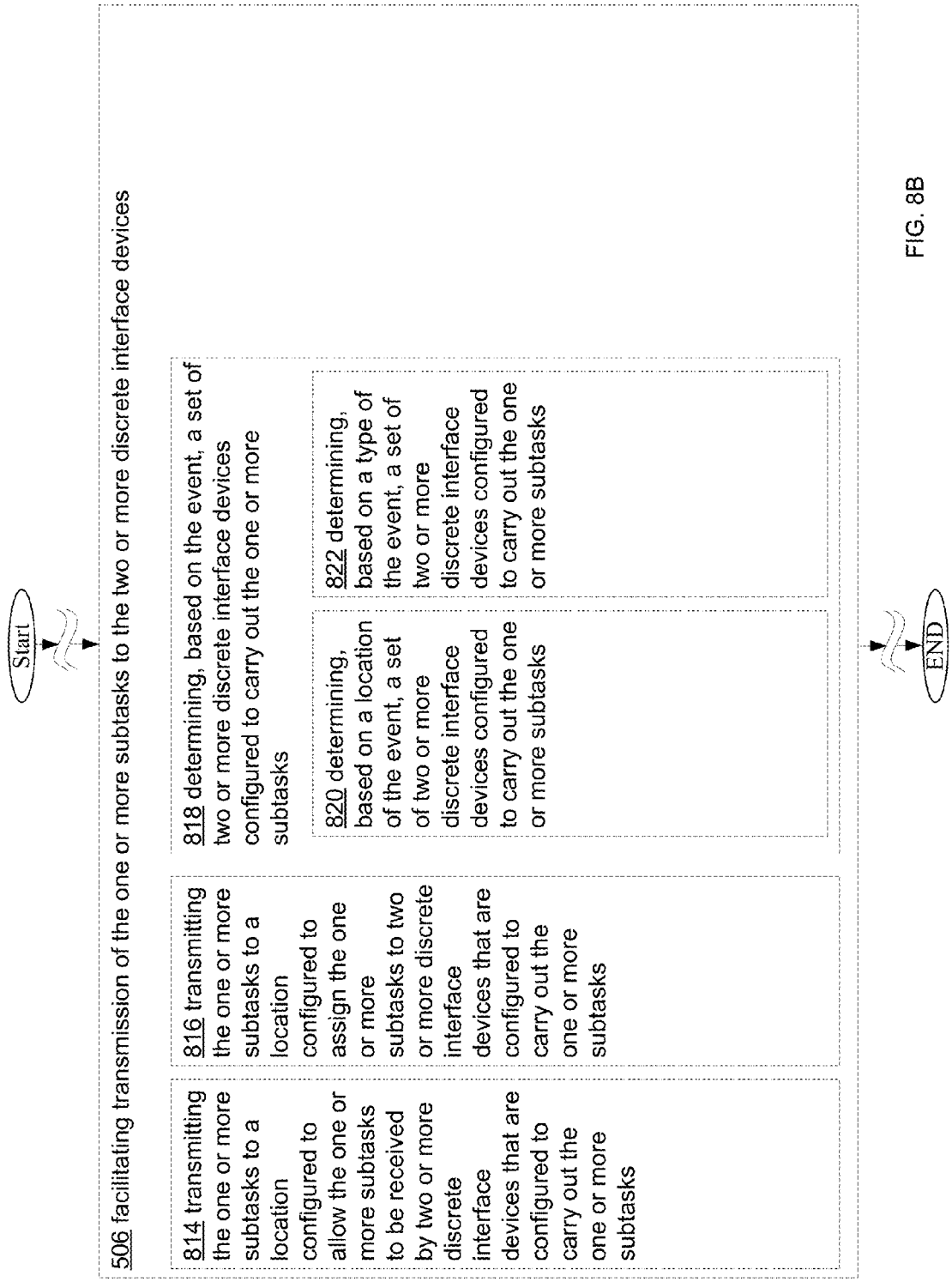
FIG. 8B is a high-level logic flowchart of a process depicting alternate implementations of a transmission facilitating operation 506 of FIG. 5.

Referring now to FIG. 8B, operation 506 may include operation 814 depicting transmitting the one or more subtasks to a location configured to allow the one or more subtasks to be received by two or more discrete interface devices that are configured to carry out the one or more subtasks. For example, FIG. 3B shows subtask to location configured to allow discrete interface devices to receive the subtask transmitting module 334 transmitting the one or more subtasks to a location configured to allow the one or more subtasks to be received (e.g., a server repository, e.g., similar to a file repository, but for subtasks, which may or may not be in the form of files) by two or more discrete interface devices (e.g., two or more laptop/desktop computers) that are configured to carry out the one or more subtasks (e.g., "measure the time between alarm sounds that are audible at your location").

Referring again to FIG. 8B, operation 506 may include operation 816 depicting transmitting the one or more subtasks to a location configured to assign the one or more subtasks to two or more discrete interface devices that are configured to carry out the one or more subtasks. For example, FIG. 3B shows subtask to location configured to assign subtask to discrete interface devices transmitting module 336 transmitting the one or more subtasks (e.g., "determine the loudness of the audience at the Pearl Jam concert") to a location (e.g., a central subtask distribution repository, run by, e.g., Google or other web service provider) configured to assign the one or more subtasks to two or more discrete interface devices (e.g., mobile phones and tablets that are detected in the vicinity of the stadium where Pearl Jam is playing) that are configured to carry out the one or more subtasks (e.g., have microphones and are in the audience)

Referring again to FIG. 8B, operation 506 may include operation 818 depicting determining, based on the event, a set of two or more discrete interface devices configured to carry out the one or more subtasks. For example, FIG. 3B shows set of two or more discrete interface devices event-based transmission determining module 338 determining, based on the event (e.g., a baseball game), a set of two or more discrete interface devices configured to carry out the one or more subtasks (e.g., for the subtask "measure the ovation that Albert Pujols gets in Anaheim," selecting a set of discrete interface devices that have microphones and are positioned inside the stadium).

Referring again to FIG. 8B, operation 818 may include operation 820 depicting determining, based on a location of the event, a set of two or more discrete interface devices configured to carry out the one or more subtasks. For example, FIG. 3B shows set of two or more discrete interface devices event location-based transmission determining module 340 determining, based on a location of the event, a set of two or more discrete interface devices configured to carry out the one or more subtasks (e.g., for a subtask of "determine the movement of snowfall through Washington, D.C.," the set of two or more discrete interface devices would be dynamically selected as information came in about which direction the snowfall was moving, such that interface devices in the path of the snowstorm could be selected).

Referring again to FIG. 8B, operation 818 may include operation 822 depicting determining, based on a type of the event, a set of two or more discrete interface devices configured to carry out the one or more subtasks. For example, FIG. 3B shows set of two or more discrete interface devices event type-based transmission determining module 342 determining, based on a type of the event (e.g., rock concert, hurricane, earthquake), a set of two or more discrete interface devices (e.g., mobile devices with various sensors on them) configured to carry out the one or more subtasks (e.g., selecting a set of interface devices with microphones for the rock concert, barometers for the hurricane, and seismometers or accelerometers for the earthquake).

Referring now to FIG. 8C, operation 506 may include operation 824 depicting determining a set of two or more discrete interface devices configured to carry out the one or more subtasks based on at least one property of the two or more discrete interface devices. For example, FIG. 3B shows discrete interface device property-based set of discrete interface devices determining module 344 determining a set of two or more discrete interface devices (e.g., an Asus Transformer Prime and a Dell Streak) configured to carry out the one or more subtasks (e.g., "determine a color suit that Dennis Rodman is wearing to the Chicago Bulls game") based on at least one property of the two or more discrete interface devices (e.g., "has a greater than 5 megapixel camera").

Referring again to FIG. 8C, operation 824 may include operation 826 depicting determining a set of two or more discrete interface devices configured to carry out the one or more subtasks based on at least one status of the two or more discrete interface devices. For example, FIG. 3B shows discrete interface device status-based set of discrete interface devices determining module 346 determining a set of two or more discrete interface devices (e.g., a Garmin Nuvi 4300 and an Apple iPad 2) configured to carry out the one or more subtasks (e.g., determine which of five evacuation routes is moving the fastest") based on at least one status of the two or more discrete interface devices (e.g., location of the discrete interface devices on one of the routes).

Referring again to FIG. 8C, operation 826 may include operation 828 depicting determining a set of two or more discrete interface devices configured to carry out the one or more subtasks based on at least one environment-dependent property of the two or more discrete interface devices. For example, FIG. 3B shows discrete interface device environment-dependent property-based set of discrete interface devices determining module 348 determining a set of two or more discrete interface devices (e.g., an HTC Resound and a Nokia Lumia) configured to carry out the one or more subtasks (e.g., "determine how many people are located at your location") based on at least one environment-dependent property (e.g., network connection speed of the device) of the two or more discrete interface devices.

Referring again to FIG. 8C, operation 826 may include operation 830 depicting determining a set of two or more discrete interface devices configured to carry out the one or more subtasks based on at least one of a particular position, proximity to the event, acceleration, velocity, and an ambient condition surrounding the interface device, of the at least two interface devices. For example, FIG. 3B shows discrete interface device list of statuses-based set of discrete interface devices determining module 350 determining a set of two or more discrete interface devices (e.g., Dell Venue Pro and Microsoft Zune) configured to carry out the one or more subtasks (e.g., "take a picture of the celebrity in the restaurant at your location") based on at least one of a particular position, proximity to the event, acceleration, velocity, and an ambient condition surrounding the interface device, of the at least two interface devices (e.g., proximity to the event, e.g., proximity to the celebrity at the restaurant).

Referring again to FIG. 8C, operation 824 may include operation 832 depicting determining a set of two or more discrete interface devices configured to carry out the one or more subtasks based on at least one characteristic of the two or more discrete interface devices. For example, FIG. 3B shows discrete interface device characteristic-based set of discrete interface devices determining module 352 determining a set of two or more discrete interface devices (e.g., a Samsung Captivate and an Olympus Digital Voice Recorder) configured to carry out the one or more subtasks (e.g., "measure the frequency of motor vehicle alarms passing through your location") based on at least one characteristic of the two or more discrete interface devices (e.g., "has a microphone").

Referring again to FIG. 8C, operation 832 may include operation 834 depicting determining a set of two or more discrete interface devices configured to carry out the one or more subtasks based on at least one environment-independent property of the two or more discrete interface devices. For example, FIG. 3B shows discrete interface device environment-independent property-based set of discrete interface devices determining module 354 determining a set of two or more discrete interface devices (e.g., Kodak Playsport and BlackBerry Torch) configured to carry out the one or more subtasks (e.g., "take a video of the oscillation of the bridge") based on at least one environment-independent property (e.g., "has a camera") of the two or more discrete interface devices.

Referring again to FIG. 8C, operation 832 may include operation 836 depicting determining a set of two or more discrete interface devices configured to carry out the one or more subtasks based on a presence of one or more of a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor of the two or more discrete interface devices. For example, FIG. 3B shows discrete interface device list of characteristics-based set of discrete interface devices determining module 356 determining a set of two or more discrete interface devices (e.g., Motorola Droid Razr, Motorola Droid X) configured to carry out the one or more subtasks (e.g., "determine how much snow has fallen at your location") based on a presence of one or more of a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor of the two or more discrete interface devices (e.g., a thermometer, thus it is not required that the selection criteria be a requirement to carry out the subtask).

Referring now to FIG. 8D, operation 824 may include operation 838 depicting determining a set of two or more discrete interface devices configured to carry out the one or more subtasks based on at least one property of the two or more discrete interface devices used to collect information regarding the event. For example, FIG. 3B shows property used to collect information based set of discrete interface devices determining module 358 determining a set of two or more discrete interface devices (e.g., the LG Optimus 7 and the Samsung Focus S) configured to carry out the one or more subtasks (e.g., "record the crowd noise for the song 'Yellow Ledbetter' at the Pearl Jam concert") based on at least one property (e.g., "has a microphone") of the two or more discrete interface devices used to collect information (e.g., sound information) regarding the event (e.g., the playing of 'Yellow Ledbetter' at the Pearl Jam concert).

Referring again to FIG. 8D, operation 838 may include operation 840 depicting determining a set of two or more discrete interface devices configured to carry out the one or more subtasks based on a presence of a barometer within the two or more discrete interface devices, used to collect information regarding the hurricane event. For example, FIG. 3B shows barometer used to collect information on hurricane based set of discrete interface devices determining module 360 determining a set of two or more discrete interface devices (e.g., five discrete interface devices that have barometers) configured to carry out the one or more subtasks (e.g., "measure the barometric pressure drop every thirty seconds") based on a presence of a barometer within the two or more discrete interface devices (e.g., the discrete interface device has access to local barometric pressure information), used to collect information regarding the hurricane event.

Referring again to FIG. 8D, operation 506 may include operation 842 depicting transmitting a signal to the two or more discrete interface devices to activate execution of the one or more subtasks which were previously transmitted to the two or more discrete interface devices. For example, FIG. 3B shows signal activating execution of previously transmitted subtasks to discrete interface devices transmitting module 362 transmitting a signal to the two or more discrete interface devices (e.g., HTC Amaze and BlackBerry Bold) to activate execution of the one or more subtasks (e.g., "take a picture of the damage to the building") which were previously transmitted (e.g., by a different server, or acquired in some other manner) to the two or more discrete interface devices Referring again to FIG. 8D, operation 842 may include operation 844 depicting transmitting a signal to the two or more discrete interface devices to activate execution of the one or more subtasks which were previously transmitted to the two or more discrete interface devices prior to the occurrence of the event. For example, FIG. 3B shows signal activating execution of event-prior previously transmitted subtasks to discrete interface devices transmitting module 364 transmitting a signal to the two or more discrete interface devices (e.g., Pantech Pocket smartphone and HP Touchpad tablet) to activate execution of the one or more subtasks (e.g., "measure the barometric pressure at your location") which were previously transmitted to the two or more discrete interface devices prior to the occurrence of the event (e.g., before the hurricane, either months before, e.g., in eventual preparation, or very soon before, after the interface devices were identified as potentially useful in collecting data).

Figure 8E:
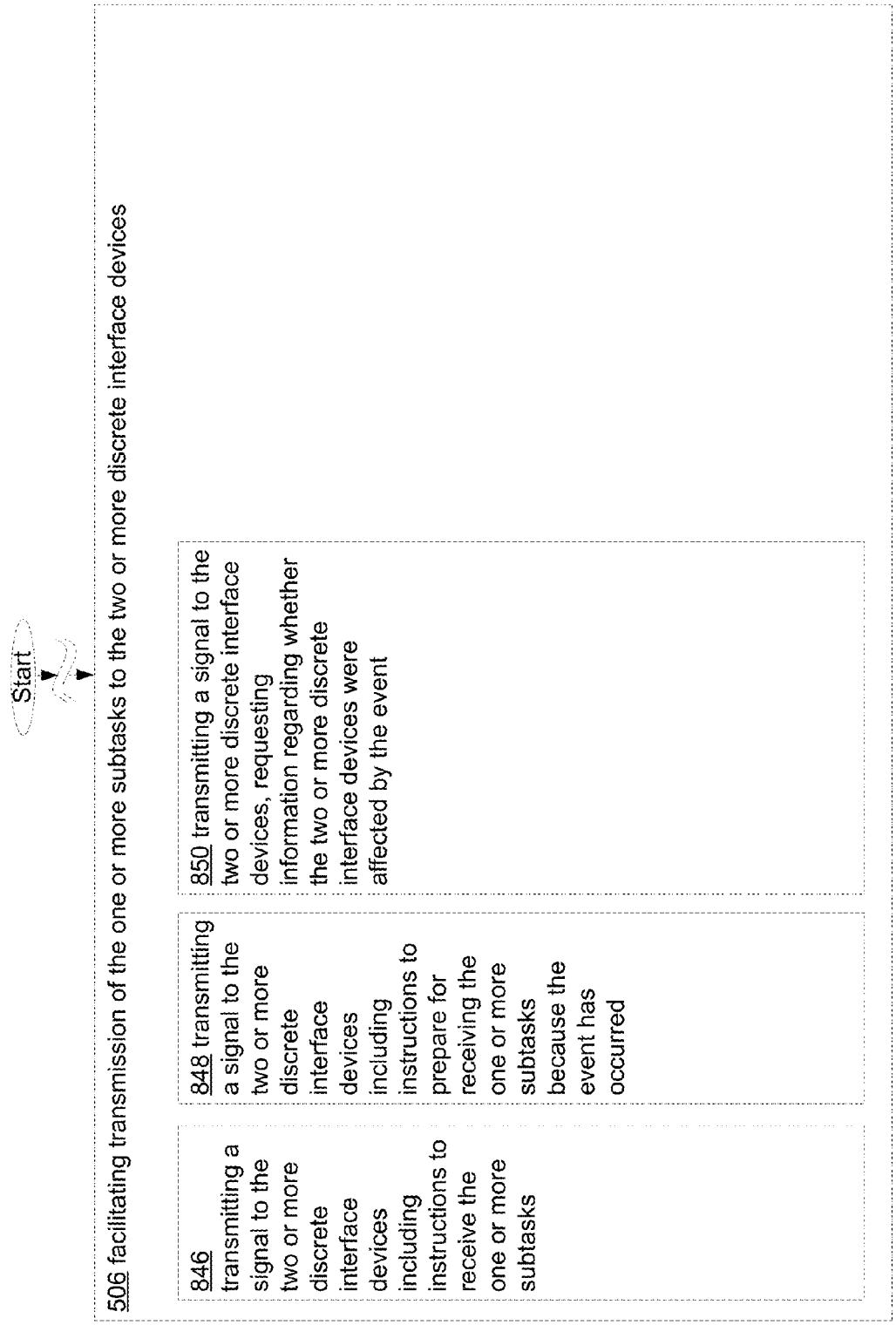
FIG. 8E is a high-level logic flowchart of a process depicting alternate implementations of a transmission facilitating operation 506 of FIG. 5.

Referring now to FIG. 8E, operation 506 may include operation 846 depicting transmitting a signal to the two or more discrete interface devices including instructions to receive the one or more subtasks. For example, FIG. 3B shows signal including subtask receiving instructions transmitting to discrete interface devices module 366 transmitting a signal to the two or more discrete interface devices (e.g., HTC HD2 and Samsung Focus S smartphones) including instructions to receive the one or more subtasks (e.g., instructions regarding where to get the subtasks, credentials for logging into the subtask location, or the communication protocol used to transmit the subtasks).

Referring again to FIG. 8E, operation 506 may include operation 848 depicting transmitting a signal to the two or more discrete interface devices including instructions to prepare for receiving the one or more subtasks because the event has occurred. For example, FIG. 3B shows signal including instructions to prepare for subtask receipt transmitting to discrete interface devices module 368 transmitting a signal to the two or more discrete interface devices (e.g., the Apple iPhone 4 and the Sony Tablet S) including instructions to prepare for receiving the one or more subtasks (e.g., prioritize receipt of subtasks) because the event has occurred (e.g., sending the signal including preparation instructions in response to the event, e.g., an earthquake).

Referring again to FIG. 8E, operation 506 may include operation 850 depicting transmitting a signal to the two or more discrete interface devices, requesting information regarding whether the two or more discrete interface devices were affected by the event. For example, FIG. 3B shows signal requesting information regarding whether discrete interface devices were affected by the event transmitting module 370 transmitting a signal to the two or more discrete interface devices (e.g., the Palm Pre Plus and the HTC Surround smartphones), requesting information regarding whether the two or more discrete interface devices were affected (e.g., either the device functionality or the ability of the user to use the device or to move about freely) by the event (e.g., an underground subway explosion).

Figure 9A:
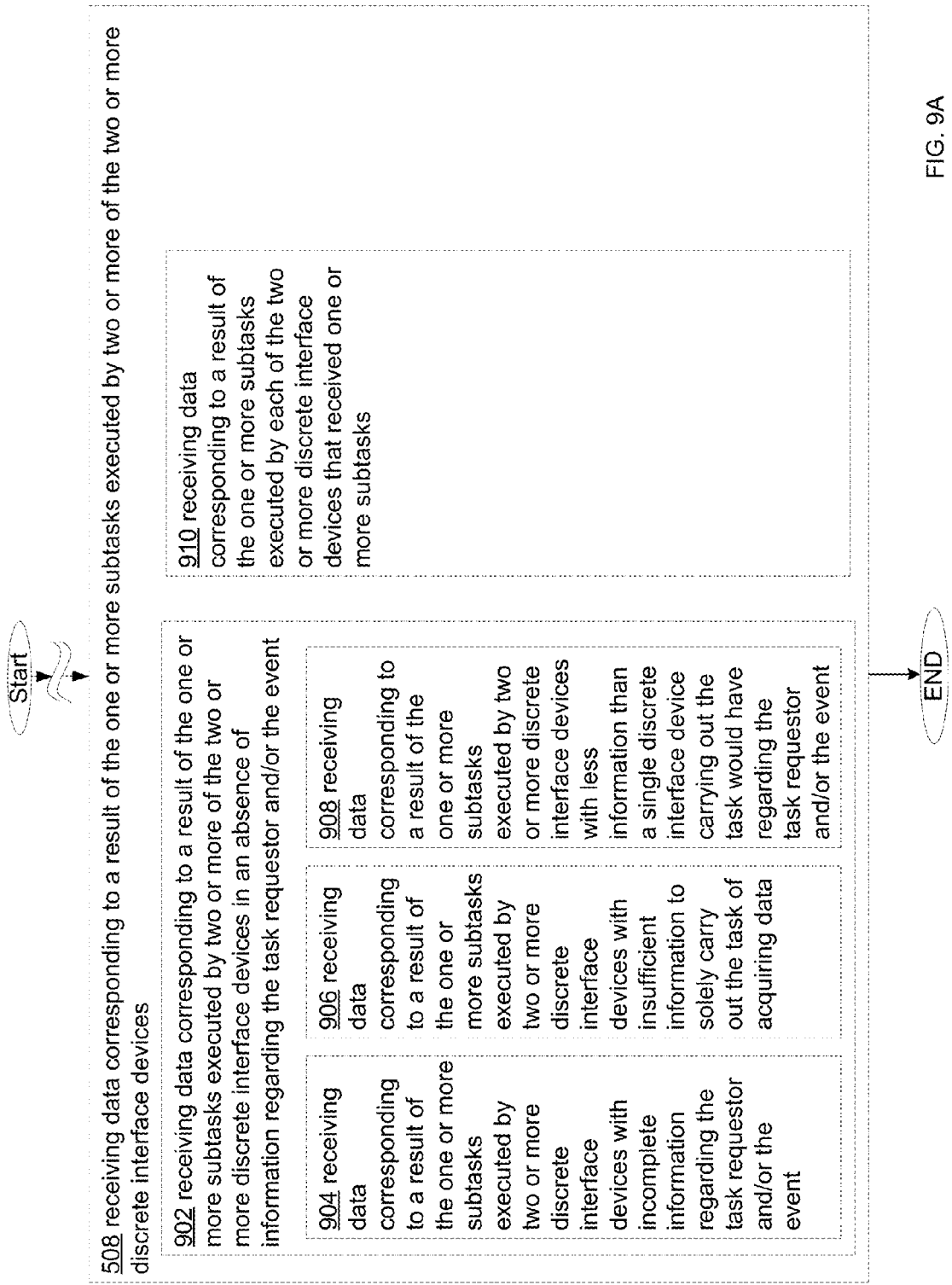
FIG. 9A is a high-level logic flowchart of a process depicting alternate implementations of a data receiving operation 508 of FIG. 5. 1
Figure 9B:
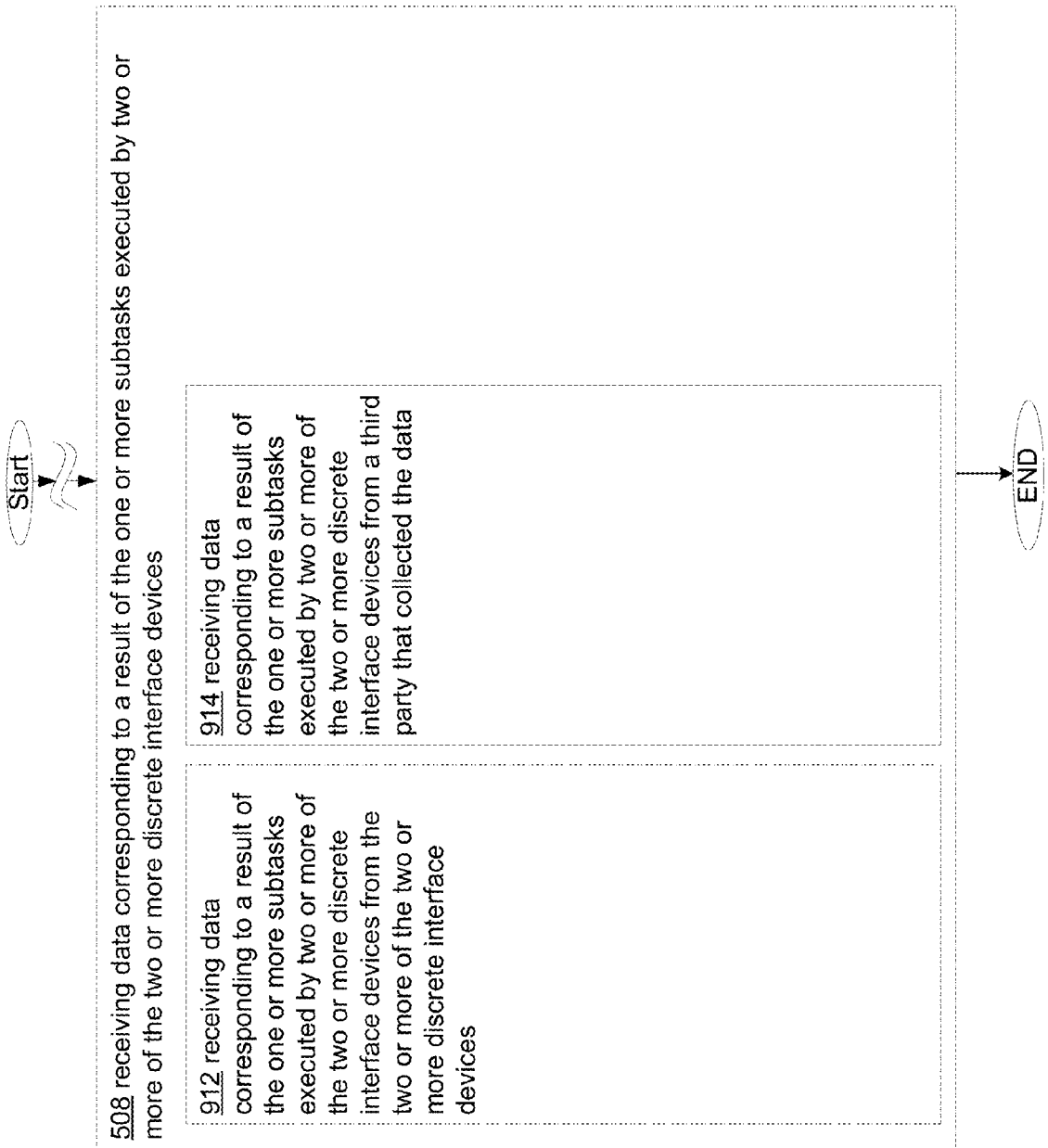
FIG. 9B is a high-level logic flowchart of a process depicting alternate implementations of a data receiving operation 508 FIG. 5.

FIGS. 9A-9B depict various implementations of operation 508, according to embodiments. Referring now to FIG. 9A, operation 508 may include operation 902 depicting receiving data corresponding to a result of the one or more subtasks executed by two or more of the two or more discrete interface devices in an absence of information regarding the task requestor and/or the event. For example, FIG. 4 shows discrete interface device executing subtask in absence of information regarding task requestor and/or event result data receiving module 402 receiving data corresponding to a result (e.g., barometric pressure data) of the one or more subtasks (e.g., "determine the barometric pressure at your location every seventy seconds") executed by two or more of the two or more discrete interface devices (e.g., of the twenty-five devices with barometers to which the subtask was transmitted, receiving result data from twenty of them) in an absence of information regarding the task requestor and/or the event (e.g., the barometric pressure subtask devices may not know all the details about the requestor of the subtask (e.g., national weather service, local police, interested casual observers) or all the information about the event (e.g., they may know or suspect a hurricane, but do not have sufficient data on its path or impact)).

It is noted that "in an absence of information" does not imply a complete absence of information, but rather that the interface devices carrying out the subtasks have a smaller subset of information than a single device carrying out the task of acquiring data would have. In some instances, a sufficiently advanced interface device could infer the task of acquiring data, or guess the task of acquiring data, but the interface device would still be operating in an "absence of information" as defined in the claims. It is not necessary for the interface device to operate in a complete lack of information regarding the task and/or the task requestor to operate in an absence of information. Some exemplary "absence of information" scenarios will be discussed in more detail herein. These examples are not intended to be exhaustive but rather to illustrate examples of scenarios that present an "absence of information."

Referring again to FIG. 9A, operation 902 may include operation 904 depicting receiving data corresponding to a result of the one or more subtasks executed by two or more discrete interface devices with incomplete information regarding the task requestor and/or the event. For example, FIG. 4 shows discrete interface device executing subtask with incomplete information regarding task requestor and/or event result data receiving module 404 receiving data corresponding to a result (e.g., sound data) of the one or more subtasks (e.g., "determine the noise level at the concert at a particular time") executed by two or more discrete interface devices (e.g., Apple iPhone 4S and Samsung Epic Touch smartphones) with incomplete information regarding the task requestor and/or the event (e.g., the devices carrying out the subtasks may know some facts about the task requestor and/or the event, but do not have complete information, e.g., do not know for what purpose they are collecting data, or for whom they are collecting data).

Referring again to FIG. 9A, operation 902 may include operation 906 depicting receiving data corresponding to a result of the one or more subtasks executed by two or more discrete interface devices with insufficient information to solely carry out the task of acquiring data. For example, FIG. 4 shows discrete interface device executing subtask with insufficient information regarding task requestor and/or event result data receiving module 406 receiving data corresponding to a result of the one or more subtasks (e.g., "determine the length of the line for a flu shot at the nearest flu shot location") executed by two or more discrete interface devices (e.g., Nokia E5, Motorola Droid X smartphones) with insufficient information to solely carry out the task of acquiring data (e.g., the task is "determine how much flu shot shortage there is in each area of Southwest Washington, D.C." The Nokia E5 and the Droid X only know that they are determining the length of the line for a flu shot at the nearest location, they do not have enough information to carry out the entire task of acquiring data, e.g., "determine how much flu shot shortage there is in Southwest Washington D.C.").

Referring again to FIG. 9A, operation 902 may include operation 908 depicting receiving data corresponding to a result of the one or more subtasks executed by two or more discrete interface devices with less information than a single discrete interface device carrying out the task would have regarding the task requestor and/or the event. For example, FIG. 4 shows discrete interface device executing subtask with less information regarding task requestor and/or event result data receiving module 408 receiving data corresponding to a result of the one or more subtasks (e.g., "determine whether the building you are in has power") executed by two or more discrete interface devices (e.g., Apple iPhone 4, BlackBerry Bold) with less information than a single discrete interface device carrying out the task (e.g., "determine which houses south of 92nd street do not have power") would have regarding the task requestor and/or the event (e.g., the power outage).

Referring again to FIG. 9A, operation 508 may include operation 910 depicting receiving data corresponding to a result of the one or more subtasks executed by each of the two or more discrete interface devices that received one or more subtasks. For example, FIG. 4 shows each of two or more discrete interface devices subtask result data receiving module 410 receiving data corresponding to a result of the one or more subtasks (e.g., "determine how fast you are moving along the evacuation route") executed by each of the two or more discrete interface devices (e.g., Garmin Nuvi 4300, TomTom Navigator, the OnStar system in a Chevy Tahoe, the HTC Droid Incredible, the HTC EVO Flyer, and the Dell XPS being used inside a car) that received the one or more subtasks.

Referring now to FIG. 9B, operation 508 may include operation 912 depicting receiving data corresponding to a result of the one or more subtasks executed by two or more of the two or more discrete interface devices from the two or more of the two or more discrete interface devices. For example, FIG. 4 shows each of two or more discrete interface devices subtask result data receiving directly from two or more discrete interface devices module 412 receiving data corresponding to a result of the one or more subtasks (e.g., "determine the water level by the river at the point closest to your location") executed by two or more of the two or more discrete interface devices (e.g., HTC Evo View tablet, HTC Amaze smartphone) from the two or more of the two or more discrete interface devices (e.g., the result data is received from the devices themselves, without being first collected and/or processed by a third party).

Referring again to FIG. 9B, operation 508 may include operation 914 depicting receiving data corresponding to a result of the one or more subtasks executed by two or more of the two or more discrete interface devices from a third party that collected the data. For example, FIG. 4 shows each of two or more discrete interface devices subtask result data receiving from third party module 414 receiving data corresponding to a result of the one or more subtasks (e.g., "take a picture of the exterior of the building you are in") executed by two or more of the two or more discrete interface devices (e.g., the Palm Pre Plus and the Motorola Droid X) from a third party (e.g., the communication network, e.g., Verizon, or the manufacturer of the device, or the manufacturer of the device operating system) that collected the data.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "capable of being operably coupled", to each other to achieve the desired functionality. Specific examples of operably coupled include but are not limited to physically mateable and/or physically interacting components and/or wirelessly interactable and/or wirelessly interacting components and/or logically interacting and/or logically interactable components.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., " a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, those skilled in the art will appreciate that recited operations therein may generally be performed in any order. In addition, although various operational flows are presented in a sequence(s), it should be understood that the various operations may be performed in other orders than those that are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A system comprising:
   circuitry configured to detect an occurrence of an event;
   circuitry configured to acquire one or more subtasks configured to be carried out by two or more discrete interface devices, the one or more subtasks corresponding to one or more portions of one or more tasks of acquiring information related to the event;
   circuitry configured to facilitate transmission of the one or more subtasks to the two or more discrete interface devices; and
   circuitry configured to receive data corresponding to a result of the one or more subtasks executed by two or more of the two or more discrete interface devices.

2. The system of claim 1, wherein said circuitry configured to detect an occurrence of an event comprises:
   circuitry configured to receive notification of an occurrence of an event.

3. The system of claim 2, wherein said circuitry configured to receive notification of an occurrence of an event comprises:
   circuitry configured to receive notification of an occurrence of a triggered event.

4. The system of claim 3, wherein said circuitry configured to receive notification of an occurrence of a triggered event comprises:
   circuitry configured to receive notification of an occurrence of a push button event.

5. The system of claim 1, wherein said circuitry configured to detect an occurrence of an event comprises:
   circuitry configured to detect an occurrence of a condition.

6. The system of claim 5, wherein said circuitry configured to detect an occurrence of a condition comprises:
   circuitry configured to detect an occurrence of an increasing audience noise level.

7. The system of claim 6, wherein said circuitry configured to detect an occurrence of an increasing audience noise level comprises:
   circuitry configured to detect an occurrence of an increasing audience noise level that indicates that a band has started playing.

8. The system of claim 1, wherein said circuitry configured to detect an occurrence of an event comprises:
   circuitry configured to detect an occurrence of a particular software installation event.

9. The system of claim 1, wherein said circuitry configured to detect an occurrence of an event comprises:
   circuitry configured to detect an occurrence of an event start.

10. The system of claim 1, wherein said circuitry configured to detect an occurrence of an event comprises:
    circuitry configured to detect an occurrence of an event completion.

11. The system of claim 1, wherein said circuitry configured to detect an occurrence of an event comprises:
    circuitry configured to detect an occurrence of an event at a particular location.

12. The system of claim 1, wherein said circuitry configured to detect an occurrence of an event comprises:
    circuitry configured to detect an occurrence of an event having a particular property.

13. The system of claim 12, wherein said circuitry configured to detect an occurrence of an event having a particular property comprises:
    circuitry configured to detect an occurrence of an event visible to a particular number of people.

14. The system of claim 12, wherein said circuitry configured to detect an occurrence of an event having a particular property comprises:
    circuitry configured to detect an occurrence of a natural disaster event.

15. The system of claim 1, wherein said circuitry configured to detect an occurrence of an event comprises:
    circuitry configured to detect a presence of a particular person in a particular location.

16. The system of claim 1, wherein said circuitry configured to detect an occurrence of an event comprises:
    circuitry configured to receive notification from a discrete interface device that an event has occurred; and
    circuitry configured to verify occurrence of the event.

17. The system of claim 16, wherein said circuitry configured to verify occurrence of the event comprises:

circuitry configured to receive further notification from a predetermined number of additional discrete interface devices that the event has occurred.

18. The system of claim 1, wherein said circuitry configured to facilitate transmission of the one or more subtasks to the two or more discrete interface devices comprises:

circuitry configured to transmit the one or more subtasks to two or more discrete interface devices that are configured to carry out the one or more subtasks, wherein the one or more subtasks include one or more of determining how much snow has fallen at a location, taking a picture of a lunar eclipse, collecting image data of an area in proximity to the event, measuring air quality at a location, determining wind speed at a particular location, and determining how many people are waiting in line for acquisition of a vaccine.

19. The system of claim 1, further comprising:

circuitry configured to determine, based on the event, a set of two or more discrete interface devices configured to carry out the one or more subtasks.

20. The system of claim 19, wherein said circuitry configured to determine, based on the event, a set of two or more discrete interface devices configured to carry out the one or more subtasks comprises:

circuitry configured to determine, based on a location of the event, a set of two or more discrete interface devices configured to carry out the one or more subtasks.

21. The system of claim 19, wherein said circuitry configured to determine, based on the event, a set of two or more discrete interface devices configured to carry out the one or more subtasks comprises:

circuitry configured to determine, based on a type of the event, a set of two or more discrete interface devices configured to carry out the one or more subtasks.

22. The system of claim 1, further comprising:

circuitry configured to determine a set of two or more discrete interface devices configured to carry out the one or more subtasks based on at least one property of the two or more discrete interface devices.

23. The system of claim 22, wherein said circuitry configured to determine a set of two or more discrete interface devices configured to carry out the one or more subtasks based on at least one property of the two or more discrete interface devices comprises:

circuitry configured to determine a set of two or more discrete interface devices configured to carry out the one or more subtasks based on at least one status of the two or more discrete interface devices.

24. The system of claim 22, wherein said circuitry configured to determine a set of two or more discrete interface devices configured to carry out the one or more subtasks based on at least one property of the two or more discrete interface devices comprises:

circuitry configured to determine a set of two or more discrete interface devices configured to carry out the one or more subtasks based on at least one characteristic of the two or more discrete interface devices.

25. The system of claim 1, wherein said circuitry configured to receive data corresponding to a result of the one or more subtasks executed by two or more of the two or more discrete interface devices comprises:

circuitry configured to receive data corresponding to a result of the one or more subtasks executed by two or more of the two or more discrete interface devices in an absence of information regarding a task requestor and/or the event.

26. The system of claim 25, wherein said circuitry configured to receive data corresponding to a result of the one or more subtasks executed by two or more of the two or more discrete interface devices in an absence of information regarding a task requestor and/or the event comprises:

circuitry configured to receive data corresponding to a result of the one or more subtasks executed by two or more of the two or more discrete interface devices with incomplete information regarding a task requestor and/or the event.

27. The system of claim 25, wherein said circuitry configured to receive data corresponding to a result of the one or more subtasks executed by two or more of the two or more discrete interface devices in an absence of information regarding a task requestor and/or the event comprises:

circuitry configured to receive data corresponding to a result of the one or more subtasks executed by two or more of the two or more discrete interface devices with insufficient information to solely carry out the one or more tasks.

28. The system of claim 1, wherein said circuitry configured to receive data corresponding to a result of the one or more subtasks executed by two or more of the two or more discrete interface devices comprises:

circuitry configured to receive from two or more of the two or more discrete interface devices data corresponding to a result of the one or more subtasks executed by the two or more of the two or more discrete interface devices.

29. The system of claim 1, wherein said circuitry configured to receive data corresponding to a result of the one or more subtasks executed by two or more of the two or more discrete interface devices comprises:

circuitry configured to receive data corresponding to a result of the one or more subtasks executed by two or more of the two or more discrete interface devices from a third party that collected the data.

30. The system of claim 1, wherein said circuitry configured to receive data corresponding to a result of the one or more subtasks executed by two or more of the two or more discrete interface devices comprises:

circuitry configured to acquire one or more subtasks to be carried out by two or more discrete interface devices, the one or more subtasks corresponding to one or more portions of one or more tasks of acquiring information related to the event, wherein the one or more subtasks include one or more of determining how much snow has fallen at a location, taking a picture of a lunar eclipse, collecting image data of an area in proximity to the event, measuring air quality at a location, determining wind speed at a particular location, and determining how many people are waiting in line for acquisition of a vaccine.

* * * * *